(12) United States Patent
Saraiya et al.

(10) Patent No.: US 12,271,741 B2
(45) Date of Patent: Apr. 8, 2025

(54) CRITICAL EVENT MANAGEMENT USING PREDICTIVE MODELS, AND RELATED METHODS AND SOFTWARE

(71) Applicant: Everbridge, Inc., Burlington, MA (US)

(72) Inventors: Urvish Saraiya, Westborough, MA (US); Eamon G. O Neill, Newton, MA (US); Cory Veilleux, Hardwick, MA (US); Prashant Desai, Lexington, MA (US); Diptesh Shah, Ashland, MA (US); Prashant Darisi, Nashua, NH (US); Christopher E. Seline, Washington, DC (US); Anton Dam, Orinda, CA (US)

(73) Assignee: Everbridge, Inc., Burlington, MA (US)

( * ) Notice: Subject to any disclaimer, the term of this patent is extended or adjusted under 35 U.S.C. 154(b) by 0 days.

(21) Appl. No.: 18/225,470

(22) Filed: Jul. 24, 2023

(65) Prior Publication Data

US 2023/0367613 A1  Nov. 16, 2023

Related U.S. Application Data

(63) Continuation of application No. 17/290,800, filed as application No. PCT/US2019/059471 on Nov. 1, 2019, now Pat. No. 11,775,323.
(Continued)

(51) Int. Cl.
*G06F 9/451* (2018.01)
*G06F 3/04847* (2022.01)
(Continued)

(52) U.S. Cl.
CPC .......... *G06F 9/451* (2018.02); *G06F 3/04847* (2013.01); *G06F 16/9017* (2019.01); *G06Q 10/0635* (2013.01); *G06Q 10/0637* (2013.01)

(58) Field of Classification Search
CPC .. G06F 9/451; G06F 16/9017; G06F 3/04847; G06Q 10/0635; G06Q 10/0637
See application file for complete search history.

(56) References Cited

U.S. PATENT DOCUMENTS

| 8,655,823 B1 | 2/2014 | Kumar |
| 9,262,731 B1 | 2/2016 | Koushik |

(Continued)

OTHER PUBLICATIONS

International Search Report and Written Opinion dated May 10, 2020, in connection with PCT/US2019/059471, filed Nov. 1, 2019.

(Continued)

*Primary Examiner* — Daniel Samwel
(74) *Attorney, Agent, or Firm* — Downs Rachlin Martin PLLC

(57) ABSTRACT

Analytics dashboards for critical event management systems that include artificial-intelligence (AI) functionalities, and related software. AI functionalities disclosed include pattern recognition and predictive modelling. One or more pattern-recognition algorithms can be used, for example, to identified patterns or other groupings within stored critical events, which can then be used to improve response performance and/or to inform the generation of predictive models. One or more predictive-modeling algorithms can be used to generate one or more predictive models that can then be used, for example, to make predictions about newly arriving critical events that can then be used, among other things, to provide optimal response performance and allow users to efficiently and effectively manage responses critical events. These and other features are described in detail.

20 Claims, 20 Drawing Sheets

Related U.S. Application Data

(60) Provisional application No. 62/754,303, filed on Nov. 1, 2018.

(51) Int. Cl.
  *G06F 16/901* (2019.01)
  *G06Q 10/0635* (2023.01)
  *G06Q 10/0637* (2023.01)

(56) References Cited

U.S. PATENT DOCUMENTS

| | | | |
|---|---|---|---|
| 9,373,081 B2 | 6/2016 | Lorge | |
| 9,852,265 B1 | 12/2017 | Treacy | |
| 10,277,622 B2 | 4/2019 | DiGiambattista et al. | |
| 10,599,449 B1* | 3/2020 | Chatzipanagiotis | G06N 3/04 |
| 2002/0049687 A1* | 4/2002 | Helsper | H04L 41/0213 |
| | | | 706/45 |
| 2005/0065711 A1 | 3/2005 | Dahlgren et al. | |
| 2005/0090938 A1 | 4/2005 | Ranelli | |
| 2007/0136296 A1 | 6/2007 | Molesky | |
| 2008/0177687 A1 | 7/2008 | Friedlander et al. | |
| 2008/0242945 A1 | 10/2008 | Gugliotti | |
| 2011/0060945 A1* | 3/2011 | Leprince | G06F 11/2294 |
| | | | 713/1 |
| 2013/0160024 A1* | 6/2013 | Shtilman | G06F 9/5083 |
| | | | 718/105 |
| 2014/0304211 A1 | 10/2014 | Horvitz | |
| 2015/0142821 A1 | 5/2015 | Rassen | |
| 2016/0179900 A1 | 6/2016 | Stefik | |
| 2017/0083572 A1 | 3/2017 | Tankersley et al. | |
| 2017/0103361 A1* | 4/2017 | Ungerboeck | G06Q 10/063114 |
| 2017/0255192 A1 | 9/2017 | Thwaites | |
| 2018/0082449 A1 | 3/2018 | Poduri | |
| 2018/0107528 A1* | 4/2018 | Vizer | G06F 11/0781 |
| 2018/0152358 A1* | 5/2018 | Chheda | G06F 11/079 |
| 2018/0316707 A1 | 11/2018 | Dodson | |
| 2018/0349482 A1* | 12/2018 | Oliner | G06F 16/38 |
| 2019/0087570 A1 | 3/2019 | Sloane | |
| 2019/0108470 A1 | 4/2019 | Jain | |
| 2019/0180172 A1 | 6/2019 | Baughman et al. | |
| 2020/0097357 A1* | 3/2020 | Shwartz | G06F 8/70 |
| 2020/0364618 A1* | 11/2020 | Peh | G06Q 10/0635 |

OTHER PUBLICATIONS

Supplementary European Search Report, dated May 18, 2021, in connection with European Patent Application No. 19878971.1.

* cited by examiner

| Dashboard | Universe | Notifications ∨ | ITA ∨ | Incidents ∨ | Contacts ∨ | Reports | Settings ∨ | Access |

Open Incidents  Trends  Operations

∥FILTER: Priorities: ALL  Incident Templates: All  Acknowledgement Status: All  Incident Type: Closed  Time Frame: Year-to-date Service Ops (597)

View affected: Incidents (112) | Resources (9) | Services (3)

Search Incident 🔍

| Major Incidents (113) | Status | Incident ID | Incident Name | Priority | Open Time▲ | ACK Status | Opened By | Notifications |
|---|---|---|---|---|---|---|---|---|
| 404(1) → | Closed | 3976151876277791 | Major Incident Alert~ | 1-Critical | 0h 3m | Not Acknowledged | Bart Rys | 2 |
| 404(2) → | Closed | 3511608214411136 | Major Incident Alert~ INC0010872 | 1-Critical | 0h 8m | Not Acknowledged | Bart Rys | 1 |
| 404(3) → | Closed | 3963782365584 76 | Major Incident Alert~ INC5630815 6 | 1-Critical | 0h 10m | Not Acknowledged | Bart Rys | 1 |
| 404(4) → | Closed | 3511608216978 12 | Service Now Incident- Major Incident RFM - ITA | 2-High | 0h 12m | Not Acknowledged | Bart Rys | 2 |

CRITICAL EVENT MANAGEMENT USING PREDICTIVE MODELS, AND RELATED METHODS AND SOFTWARE

RELATED APPLICATION DATA

This application is a continuation of U.S. Nonprovisional patent application Ser. No. 17/290,800, filed on May 3, 2021, and titled "Analytics Dashboards For Critical Event Management Software Systems, and Related Software"; which application was a U.S. national phase of International Patent Application No. PCT/US2019/059471, filed on Nov. 1, 2019; which application claims priority to U.S. Provisional Patent Application Ser. No. 62/754,303, filed Nov. 1, 2018, and titled "Analytics Dashboards For Critical Event Management Software Systems". Each of these applications is incorporated herein by reference in its entirety.

FIELD OF THE INVENTION

The present invention generally relates to the field of critical event management software systems. In particular, the present invention is directed to Analytics Dashboards for critical event management software systems, and related software.

BACKGROUND

For a wide variety of organizations, properly managing critical events, such as information-technology (IT) incidents, severe-weather and other force-of-nature events, active-shooter events, fire events, terrorist events, etc., is important to minimize the impact (e.g., disruption to usual operations and cost) of the critical events on the organizations. Many organizations manage at least some of their critical events using critical event management (CEM) software systems available from a variety of providers, such as Everbridge Inc., Burlington, MA. Some CEM software systems provide users with a wide range of functionality, from providing graphical user interfaces (GUIs) that allow critical-event managers to view statuses of current critical event and interface with responders and response teams working to resolve critical events. Centralization of CEM afforded by contemporary CEM software systems has led to improvements in CEM that have correspondingly led to efficiencies and improved response performance. However, advancements in CEM software systems that lead to further efficiencies and performance improvements are desired.

SUMMARY

In one implementation, the present disclosure is directed to a method of displaying information to assist a user with critical-event management. The method being performed by a computing system includes retrieving, from a datastore in memory of the computing system, data contained in an analytics table comprising values for a plurality of attributes of each of a plurality of stored critical events; executing at least one pattern-recognition algorithm that operates on the data in the analytics table so as to identify one or more patterns within the plurality of attributes among the plurality of stored critical events; executing a visualization algorithm to generate a visualization depicting the one or more patterns; and displaying, via a graphical user interface (GUI) of the computing system, the visualization to the user.

In another implementation, the present disclosure is directed to a method of assisting a user with critical-event management. The method being performed by a computing system includes displaying, to a user via a graphical user interface (GUI) of the computing system, information concerning a first stored critical event; soliciting, via the GUI, a user to provide one or more attribute annotations for one or more corresponding respective attributes of the stored critical event; receiving, from the user via the GUI, the one or more attribute annotations; storing, in memory of the computing system, the one or more attribute annotations in an analytics table comprising values for a plurality of attributes of each of a plurality of stored critical events, including the first stored event; executing at least one predictive algorithm that operates on contents of the analytics table so as to build one or more predictive models representing at least some of the plurality of stored critical events; and storing, in a memory of the computing system, the one or more predictive models.

In yet another implementation, the present disclosure is directed to a method of assisting a user with critical-event management. The method being performed by a computing system includes providing, in memory of the computing system, one more predictive models of data contained in an analytics table for a plurality of stored critical events, wherein the data comprises a plurality of values for a corresponding plurality of attributes of each of the plurality of stored critical events; receiving, via an event notification interface, a notification of a new critical event; executing a predictive algorithm that uses the one or more predictive models to automatically classify one or more attributes of the new critical event; and based on the automatic classifying, predicting a value for each of the one or more attributes of the new critical event.

In still another implementation, the present disclosure is directed to a method of assisting a user with critical-event management. The method being performed by a computing system includes providing, in memory of the computing system, one more predictive models of data contained in an analytics table for a plurality of stored critical events, wherein the data comprises a plurality of values for a corresponding plurality of attributes of each of the plurality of stored critical events; receiving, via an event notification interface, a notification of a new critical event affecting a resource; executing a predictive algorithm that uses the one or more predictive models to automatically determine one or more suggested actions that a responder can take in resolving the critical event; based on the resource affected, automatically determining one or more services associated with the resource affected; displaying, via a graphical user interface (GUI) of the computing system, a service-dependency graph visually depicting the one or more services, the resource affected, and an impact that the critical event has on the one or more services, wherein the resource affected is represented by a user-selectable icon; receiving via the GUI a user selection of the user-selectable icon; and in response to the user selection, displaying to the user via the GUI a popup window that allows a user to view the one or more suggested actions.

In a further implementation, the present disclosure is directed to a computer-readable storage medium containing computer-executable instructions that, when executed by a computing system, perform any one or more of the methods disclosed herein.

In yet a further implementation, the present disclosure is directed to a system having at least one processor and a memory in operative communication with the at least one processor, wherein the memory contains computer-executable instructions that, when executed by the at least one processor, perform any one or more of the systems disclosed herein.

BRIEF DESCRIPTION OF THE DRAWINGS

For the purpose of illustrating the inventions disclosed herein, the drawings show aspects of one or more embodiments of the inventions. However, it should be understood that the present inventions are not limited to the precise arrangements and instrumentalities shown in the drawings, wherein:

FIG. 4 is a screenshot of an example attribute-annotation graphical user interface (GUI) that allows a user to annotate critical events with attribute data useful for predicting critical-event attributes and/or prescribing actions and/or resources for responding to future critical events;

DETAILED DESCRIPTION

1. Overview

Aspects of this disclosure are directed to providing one or more functionalities, for example, to a Critical Event Management (CEM) software system that allows one or more organizations to manage critical events, such as, but not limited to, Information Technology (IT) incidents, weather or other force-of-nature disasters, cyber-attacks, mass shootings, accidents, terrorist attacks, and explosions, among others. As described below in detail, these functionalities include, but are not limited to, identifying patterns or other groupings in historical critical event data, providing one or more Analytics Dashboards graphical user interfaces (GUIs) that allow one or more users to view and assess such patterns/groupings and implement changes that may result from such assessments, providing Dashboard Analytics GUIs that allow one or more users to augment data associated with each historical or otherwise closed critical event, generating models of critical events that enable a CEM software system to make predictions about newly arriving critical events and/or recommendations for resolving newly arriving critical events, and providing one or more Dashboard Analytics GUIs that allow user to view predictions and/or recommendations and/or take selected courses of action and/or make changes to resolution tactics based on the predictions and/or recommendations, among others. These functionalities are described generally in the following Sections 1.1 to 1.6 and exemplified in subsequent sections of this disclosure. Sections beyond 1.6 provide additional examples, additional scenarios, and additional descriptions of various aspects of CEM software systems that include one or more of the foregoing functionalities, to assist the reader in understanding the broad scope of the present disclosure.

1.1. Pattern Recognition

Figure 1:
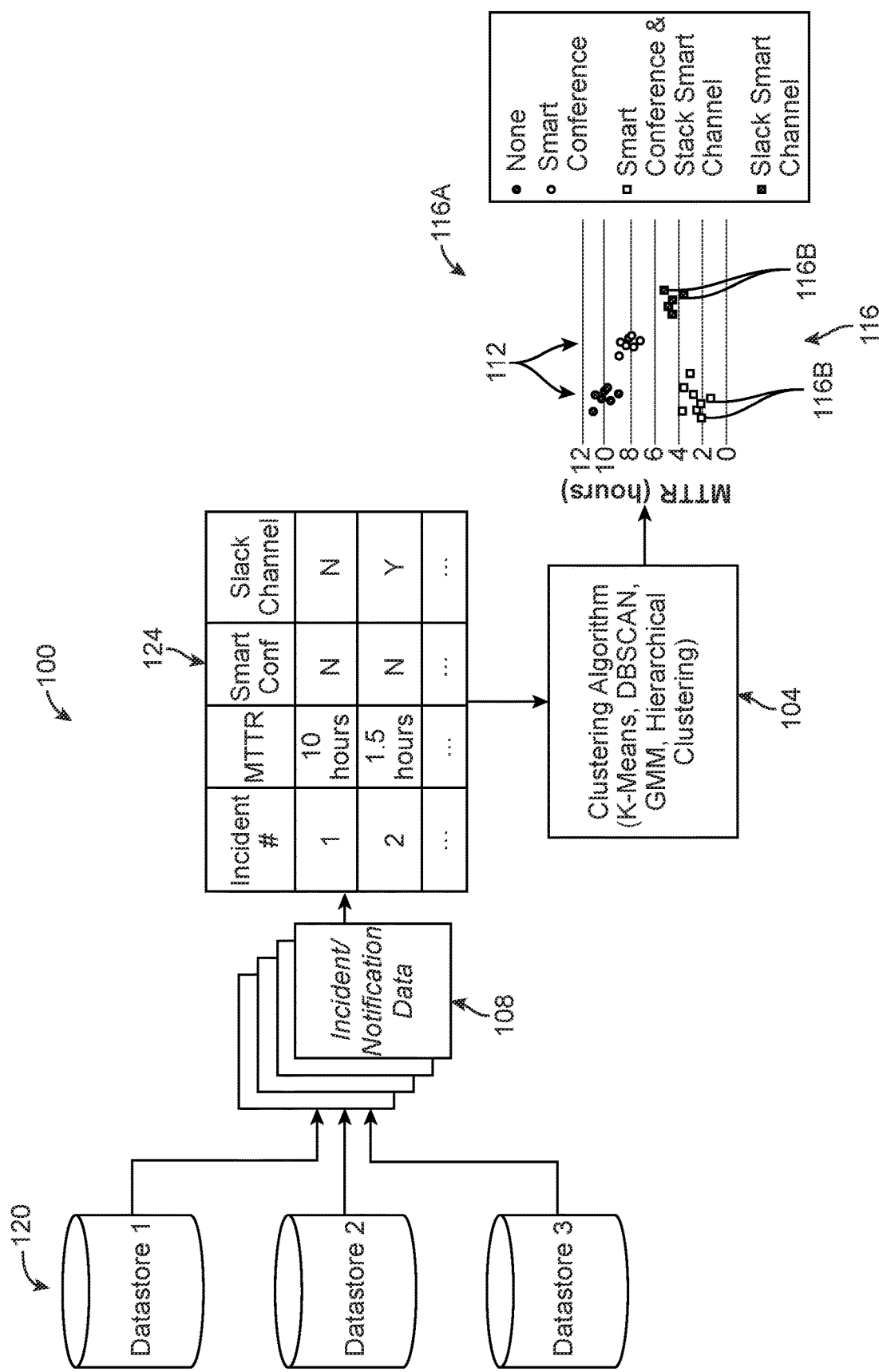
FIG. 1 is diagram illustrating an example pattern-recognition process for finding patterns within critical-event data.

Referring now to the drawings, FIG. 1 illustrates an example process 100 of using one or more pattern-recognition algorithms 104 to operate upon critical-event data 108 so as to determine patterns and/or other groupings within the critical-event data, such as the patterns/groupings 112 illustrated in a visualization GUI 116 (Analytics Dashboard GUI). When such patterns/groupings are present, they can be useful for any of a variety of purposes. These purposes include, but are not limited to: allowing a user to view representations of the patterns (here, as seen in charting GUI 116) and assess the patterns; allowing a user to make changes to response protocols and/or other CEM parameters; and/or providing bases for generating one or more predictive models of the data that can be used, for example, to permit a CEM software system to provide predictive and/or prescriptive functionalities, among other things. Examples of these and other functionalities that pattern-recognition algorithms of the present disclosure can enable are described below in detail.

Critical-event data 108 may be stored in one or more datastores 120 that may be in communication with one or more CEM software systems (not shown) or other software that stores the critical-event data. In some embodiments, critical-event data 108 is critical-event data of a single organization, such as a business organization, an educational organization, a healthcare organization, or a government organization, among others, or any combination thereof. In other embodiments, the critical-event data is critical-event data from two or more organizations. An "organization" can be any entity or collection of entities that collects critical-event data 108, such as by utilizing a CEM software system or by other means. The one or more datastores 120 may be non-shared or shared datastores. An example of a non-shared datastore is a datastore that contains critical-event data of only a single organization. An example of a shared datastore is a datastore that contains critical-event data of two or more organizations, such as in the case of a multi-tenant CEM software system implementation. Each datastore 120 may be of any physical instantiation known in the art that is able to store critical-event data 108.

FIG. 1 illustrates an example table 124 containing critical-event data 108. Example table 124 shows a very small portion of critical-event data 108. In this example, the rows of table 124 correspond to closed critical events and the columns of the table identify attributes of the critical events contained in datastore(s) 120. Here, the first column contains unique critical-event identifiers (e.g., sequential numeral ("Incident #")), the second column contains mean times to resolution (MTTRs) for the stored critical events, the third column contains indications of whether or not the stored critical events utilized a "smart conference" as part of the event resolution process, and the fourth column contains indications of whether or not the stored critical events utilized a "Slack" channel as part of the resolution process. It is noted that in this example, the actual TTR data in the MTTR column may be input by a user (e.g., via a suitable annotation GUI (not shown)) after resolution of each corresponding critical event when annotating that event for use in future iterations of pattern-recognition and modeling processes, e.g., process 100 of FIG. 1 and process 200 of FIG. 2 (below). The data in the smart conference and SLACK® channel columns may be determined automatically by an integrated CEM software system and/or may be input manually when a user is closing out an annotating a critical event once it has been resolved.

FIG. 1 illustrates two rows of critical events and four rows of attributes in table 124. Those skilled in the art will readily understand that table 124 is merely for illustration and that an actual table may have hundreds, thousands, tens of thousands, etc., of rows representing closed critical events, and tens or more of columns representing possible attributes of those critical events. In addition, while the stored critical-event data 108 is represented in tabular form in this example, those skilled in the art will readily appreciate that critical-event data 108 may be stored in any useful format. For convenience, table 124, like tables (such as table 220 in FIG. 2), and equivalent data structures for storing critical event data 108 and like data are referred to herein and in the appended claims as an "analytics table" for convenience, as it contains data used in pattern-recognition and modeling computational processes disclosed herein.

Each pattern-recognition algorithm 104 may be any suitable algorithm for finding patterns or identifying groupings of critical events within critical-event data 108. Examples of such algorithms include, but are not limited to, clustering algorithms, such as K-means algorithms, density-based spatial clustering of applications with noise (DBSCAN) algorithms, Gaussian mixture model (GMM) algorithms, and hierarchical clustering algorithms, among others. Although not illustrated, the output of pattern-recognition algorithm(s) 104 may be stored in a suitable datastore, such as any one of datastores 120, among others.

The output of pattern-recognition algorithm(s) 104 may be used by a visualization GUI, such as visualization GUI 116 of FIG. 1, that allows a user to view representations of the output of the pattern-recognition algorithm(s). Visualization GUI 116 may be configured to display any one or more of a variety of charts, graphs, tables, and/or other data-visualization graphics that allow a user to view the output of pattern-recognition algorithm(s) 104 and/or representations of such output. In the example shown, visualization GUI 116 is configured to generate at least a chart 116A that displays representations 116B (here different solidly colored circle) of the pertinent ones of the critical events that the pattern-recognition algorithm(s) 104 has/have identified for display. Chart 116A is a cluster chart that charts clusters of critical events relative to MTTR based on communications channel usage. In this example, the channel usage scenarios are "None", "Smart Conference", Slack Smart Channel", and "Smart Conference & Slack Smart Channel". As can be seen in chart 116A, in this example, representations 116B of pertinent critical events are solid-colored circles, with the lighter-colored (e.g., green) circles representing critical events having satisfactory MTTR values (e.g., below a certain threshold) and the darker-colored (e.g., red) circles representing critical events having unsatisfactory MTTR values (e.g., at or above the certain threshold). In this example, each representation 116B is a hyperlink or other control that, upon user selection (e.g., right-click, double-click, screen-touch, etc.) causes the software to display information about the selected critical event. For example, the user selection may cause visualization GUI 116 to display a popup window or dialog box (not shown, but examples shown in FIGS. 3 and 6D) that lists specific information about that critical event, such as type, identifier, date, resources used, and/or any other attributes from critical-event data 108 and/or information from the output of pattern-recognition algorithm(s) 104. Those skilled in the art will readily appreciate that upon user selection, the additional information about the selected critical event may be displayed in any other manner known in the art, such as in a non-popup window (e.g., an open window that accompanies the display of chart 116A.

The output of pattern-recognition algorithm(s) 104 may be used as a basis for automatically generating models that can be used to make predictions about critical events newly arriving to the CEM software system and/or to automatically prescribe response protocols and/or actions to take to resolve or mitigate negative effects of the critical event. Regarding predictive uses, the CEM software system may use models to predict the TTR and/or the cost of a newly arriving event based on historical critical event data 108 for similar events. Regarding prescriptive uses, the CEM software system may use models to recommend that certain action(s) be taken and/or certain response protocol(s) be followed to, for example, minimize the TTR and/or cost to the organization. As those skilled in the art will readily appreciate, once pattern-recognition algorithm(s) 104 find one or more patterns, the CEM software system can then use the attribute(s) pertinent to a particular pattern (e.g., cluster, grouping) to generate one or more corresponding models to allow the corresponding pattern(s) to be used in the predictive and/or prescriptive manner noted above. Modeling, its uses, and examples are described below in detail.

Those skilled in the art will readily understand that process 100 may be performed by any suitable software, such as pattern-recognition software that is part of a CEM software system or that can access critical event data, such as may be stored and maintained by a CEM software system. Those skilled in the art will understand that while pattern-recognition software can be part of a CEM software system, fundamentally there are no constraints on how pattern-recognition software can be deployed in the context of critical event data.

1.2. Modeling

Figure 2:
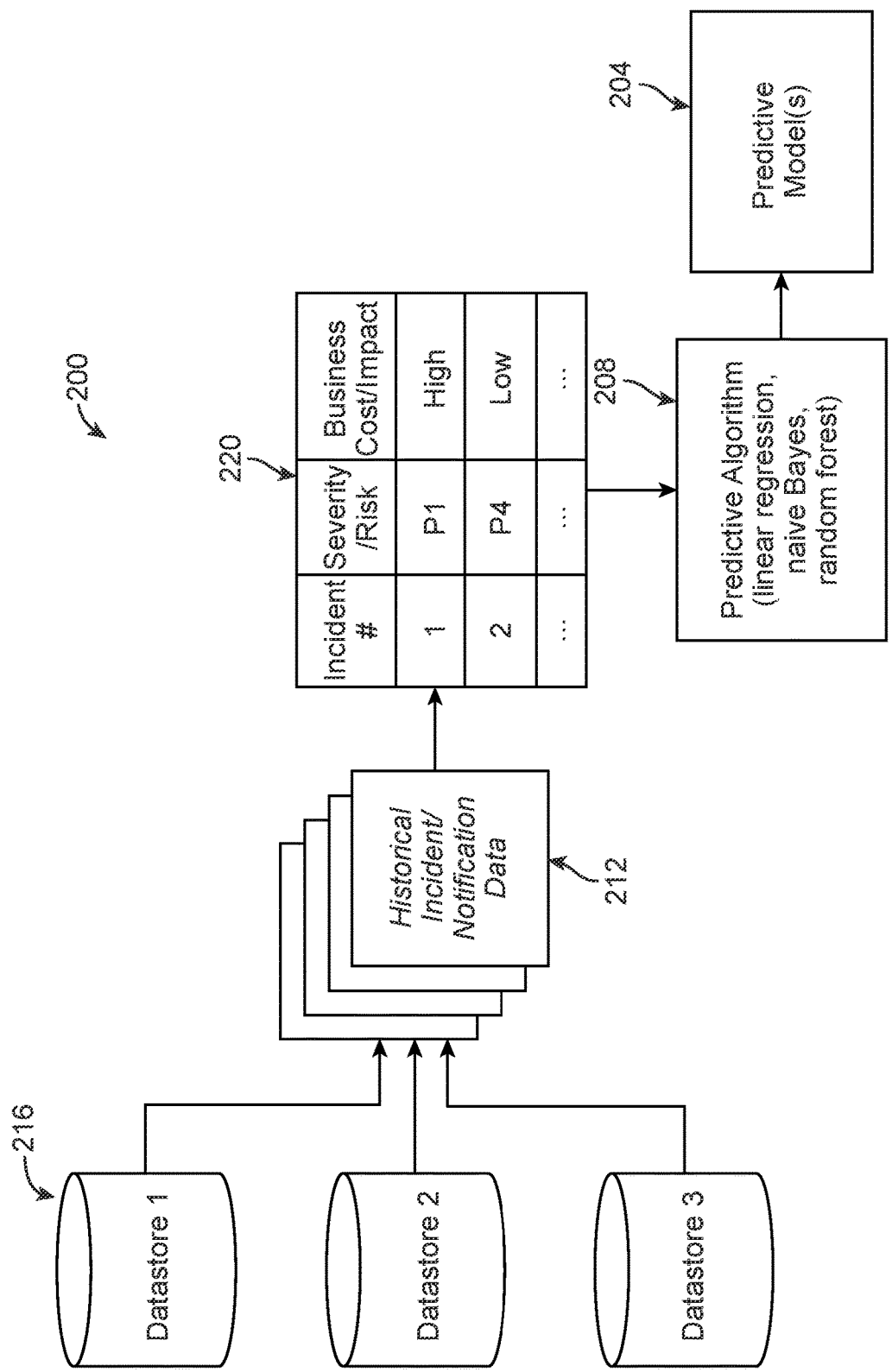
FIG. 2 is a diagram illustrating an example predictive-model-generation process for building one or more predictive models based on critical-event data.

FIG. 2 illustrates an example process 200 of generating one or more predictive models 204 that can be used for to provide one or more of a variety of functionalities to, for example, a CEM software system. As noted above, such functionalities include predictive functionality, prescriptive functionality, and response-optimization functionality. Predictive functionality may include comparing (e.g., matching, fitting, etc.) attributes of a newly arriving critical event to one or more predictive models 204 and predicting outcomes, such as one or more costs to an organization attributed to the critical event and TTR, among others, based on the comparison(s). Prescriptive functionality may include comparing (e.g., matching, fitting, etc.) attributes of a newly arriving critical event to one or more predictive models and prescribing actions and/or resources, among other things, in order to minimize impact on the organization based on the comparison(s). Optimization functionality may include, among other things, allowing users to input mock critical events, have the software compare (e.g., match) attributes of each mock critical events to one or more predictive models and output predictive and/or prescriptive data based on the comparison. A user can view the output predictive and/or prescriptive data and, if desired/needed, modify prescriptive actions and/or resources to impact the predictive modeling for future events and/or perform other optimization tasks.

Referring again to FIG. 2, process 200 includes applying one or more predictive algorithms 208 to historical critical-event data 212, which may be stored in one or more datastores 216, such as the three datastores illustrated. It is noted that each datastore 216 may be the same or different from each datastore 120 of FIG. 1. Indeed, in many instantiations and deployments processes 100 (FIG. 1) and 200 (FIG. 2) generally operate on the same critical event data. Example predictive algorithms 208 include linear regression algorithms, naïve Bayes algorithms, and random forest algorithms, among others. Those skilled in the art will readily appreciate that any suitable predictive modeling algorithm can be used. In the example shown in FIG. 2, historical critical event data is stored in a table 220, which can be the same as or similar to table 124 of FIG. 1. For simplicity, table 220 shows two rows representing two different critical events and three columns, here an "Incident #" column, a "Severity/Risk" column, and a "Business Cost/Impact" column. The data in "Severity/Risk" and "Business Cost/Impact" columns may be input by a user (e.g., via a suitable annotation GUI (not shown)) after resolution of each corresponding critical event when annotating that event for use in future iterations of pattern-recognition and modeling processes, e.g., process 100 of FIG. 1 and process 200 of FIG. 2 (below).

FIG. 2 illustrates two rows of critical events and four rows of attributes in table 220. Those skilled in the art will readily understand that table 220 is merely for illustration and that an actual table may have hundreds, thousands, tens of thousands, etc., of rows representing closed (historical) critical events, and tens or more of columns representing possible attributes of those critical events. In addition, while the stored critical-event data 212 is represented in tabular form in this example, those skilled in the art will readily appreciate that critical-event data 212 may be stored in any useful format.

Those skilled in the art will readily understand that process 200 may be performed by any suitable software, such as predictive-modeling software that is part of a CEM software system or that can access critical event data, such as may be stored and maintained by a CEM software system. Those skilled in the art will understand that while predictive-modeling software can be part of a CEM software system, fundamentally there are no constraints on how predictive-modeling software can be deployed in the context of critical event data.

1.3. Automatic Predictions for New Critical Events

Figure 3:
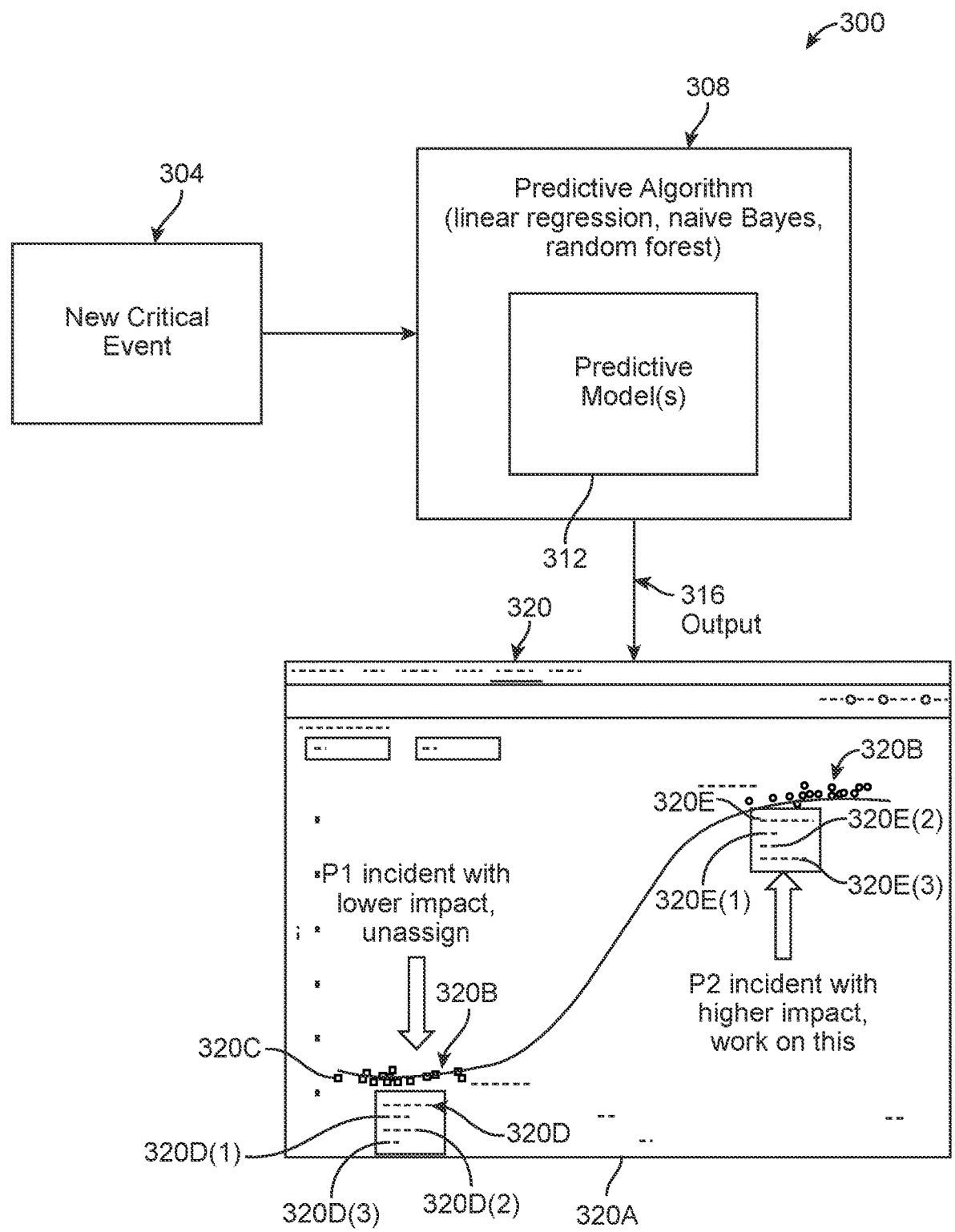
FIG. 3 is a diagram illustrating an example critical-event-prediction process for classifying a newly arriving critical event.

As discussed above, suitable software of the present disclosure may use one or more predictive models, such as predictive model(s) 204 of FIG. 2, built using a suitable process, such as process 200 of FIG. 2, to automatically predict attributes and/or other characteristics of newly arriving critical events. The software may then present results of the predictions to a user for any of a variety of purposes, such as, among other things, triaging concurrent open critical events, taking action on each critical event, modifying response protocols, and evaluating response performance. FIG. 3 illustrates an example process 300 for performing such automatic classification and results presentation.

In example process 300 of FIG. 3, the software makes one or more automatic predictions about a newly arriving critical event 304 (here, an IT incident) at a prediction block 308, for example, by comparing (e.g., matching, fitting, etc.) attributes of the newly arriving critical event with attributes of one or more predictive models 312, which may be the same as or similar to one or more predictive models 204 built in process 200 of FIG. 2. In some embodiments, results of the prediction(s) at prediction block 308 may be a predicted value for each of one or more particular attributes of newly arriving critical event 304 and corresponding respective confidence level(s) for the predicted value(s) or other predicted characteristic(s) and any associated confidence level(s). Output 316 of prediction block 308 may be the predicted value(s)/characteristic(s) and the confidence level(s), which the software may display to a user via a suitable results GUI, such as results GUI 320. As those skilled in the art will readily appreciate, the automatic prediction at prediction block 308 may be characterized as a matching or fitting of the attributes of newly arriving critical event to the one or more predictive models 312. Such matching/fitting may include comparing attributes of newly arriving critical event 304 to modeled attributes to determine a match/fit between the newly arriving critical event with the predictive model(s) 312.

Results GUI 320 may be designed and configured to display output 316 from prediction block 308 in any one or more of a variety of formats, including user-selectable formats. In FIG. 3, results GUI 320 is shown as displaying an active-critical-events screen 320A that shows all of the active critical events 320B, here, according to their predicted impact as predicted by the automatic prediction at prediction block 320. In this example, each critical event is represented as a solid-color circle (e.g., at 320C (only one labeled for simplicity)), with the color of the circle representing the level of impact of that critical event. For example, here, the lighter-color (e.g., green) circles 320C represent lower-impact ones of active critical events 320B, and the darker-color (red) represent higher-impact ones of the active critical events. In this example, each circle 320C is a hyperlink or other control that, upon user selection (e.g., right-click, double-click, etc.) causes the software to display information about the selected critical event. For example, the user selection may cause results GUI 320 to display a popup dialog box, such as dialog box 320D, 320E that lists one or more actions, such as actions 320D(1) to 320D(3) and 320E(1) to 320E(3), that the user can take, such as by selecting a corresponding one of the hyperlinked actions. Depending on the relative impact of a particular event, the actions displayed in dialog boxes 320E, 320D may be different from one another. For example, one of the actions on a lower-impact active critical event may be to change the impact to a higher level, and one of the actions on a higher-impact active critical event may be to change the impact to a lower level, among many others. Other examples of making a selection of an action from a results GUI are described below.

Those skilled in the art will readily understand that process 300 may be performed by any suitable software, such as critical-event-prediction software that is part of a CEM software system or that can access critical event data, such as may be stored and maintained by a CEM software system. Those skilled in the art will understand that while critical-event-prediction software can be part of a CEM software system, fundamentally there are no constraints on how critical-event-prediction software can be deployed in the context of critical event management.

1.4. Critical-Event Annotation

The ability to annotate closed critical events is important for providing useful predictive and prescriptive functionalities. Generally, annotation of critical events involves one or more users adding attribute data to critical events for attributes that are important to handling future critical events. For example, for determining impact of a critical event, it is important to know attributes such as overall cost to an organization, TTR, and infrastructure affect among other, as these attributes are useful for determining priority of newly arriving critical events that are automatically classified using one or more predictive models, such as the one or more predictive models 204, 312 of processes 200 and 300 discussed above. It is noted that overall cost may be the sum of a variety of costs that may be different for differing types of critical events. For example, IT incidents, which compose a subset of critical events, may have costs resulting from equipment unavailability (e.g., brand damage, lost sales, etc.), network slowness, equipment replacement, and use of resources for resolution, among others. Weather and/or other force-of-nature events may have other costs, such as facility damage/replacement costs, equipment damage/replacement cost, temporary facilities costs, workforce replacement costs, in addition to some or all of the costs mentioned above for IT incidents. Some or all of these costs can be annotated into the attribute data for critical events. With robust cost information across a growing datastore of closed critical events, predictive models involving this data can be used to classify newly arriving critical events so as to predict such costs, or any subset thereof.

FIG. 4 illustrates an annotation GUI 400 that a user can use to annotate critical events, here a set of four critical events 404(1) to 404(4) that are closed as indicated in "Status" column 408. In this example, GUI 400 initially displayed historical critical event data that had not yet been annotated to include costs. At the stage illustrated in FIG. 4, a user has entered a total cost for each of the four critical events 404(1) to 404(4). The software may then store this total cost data in an analytics table (not illustrated) for use pattern recognition and or modeling, among other things. If one or more of critical events 404(1) to 404(4) already included cost data, such as a predicted value or previously manually annotated value, a user may use GUI 400 to change the initially displayed cost data. Example processes that may use the analytics table include processes 100 and 200 described above in connection with FIGS. 1 and 2. Other columns shown in GUI 400 that can be annotatable include "Priority" column 408. For example, priority data may not have been used in older version of the CEM software such that GUI 400 is used to input priority data. As another example, priority data may already be present, such as from an automatic prediction or prior manual annotation. In either of those cases, a user can use GUI 400 to change the preexisting priority data. Those skilled in the art will readily understand that the example GUI 400 and scenario illustrated in FIG. 4 is limited in scope for simplicity but that software of the present disclosure can provide annotation functionality for adding and/or changing attribute values for as many attributes across as many closed critical events as needed. When annotations have been made and saved, the analytics table is updated accordingly. As discussed below, pattern-recognition and/or modeling processes, such as processes 100 and 200 described above, can be run periodically or non-periodically to incorporate the changes in the updated analytics table into the identified patterns/groupings and predictive model(s).

Those skilled in the art will readily understand that GUI 400 may be provided by any suitable software, such as critical-event-annotation software that is part of a CEM software system or that can access critical event data, such as may be stored and maintained by a CEM software system. Those skilled in the art will understand that while critical-event-annotation software can be part of a CEM software system, fundamentally there are no constraints on how critical-event-annotation software can be deployed in the context of critical event data.

1.5. Critical-Event Predictive Analytics

Figure 5:
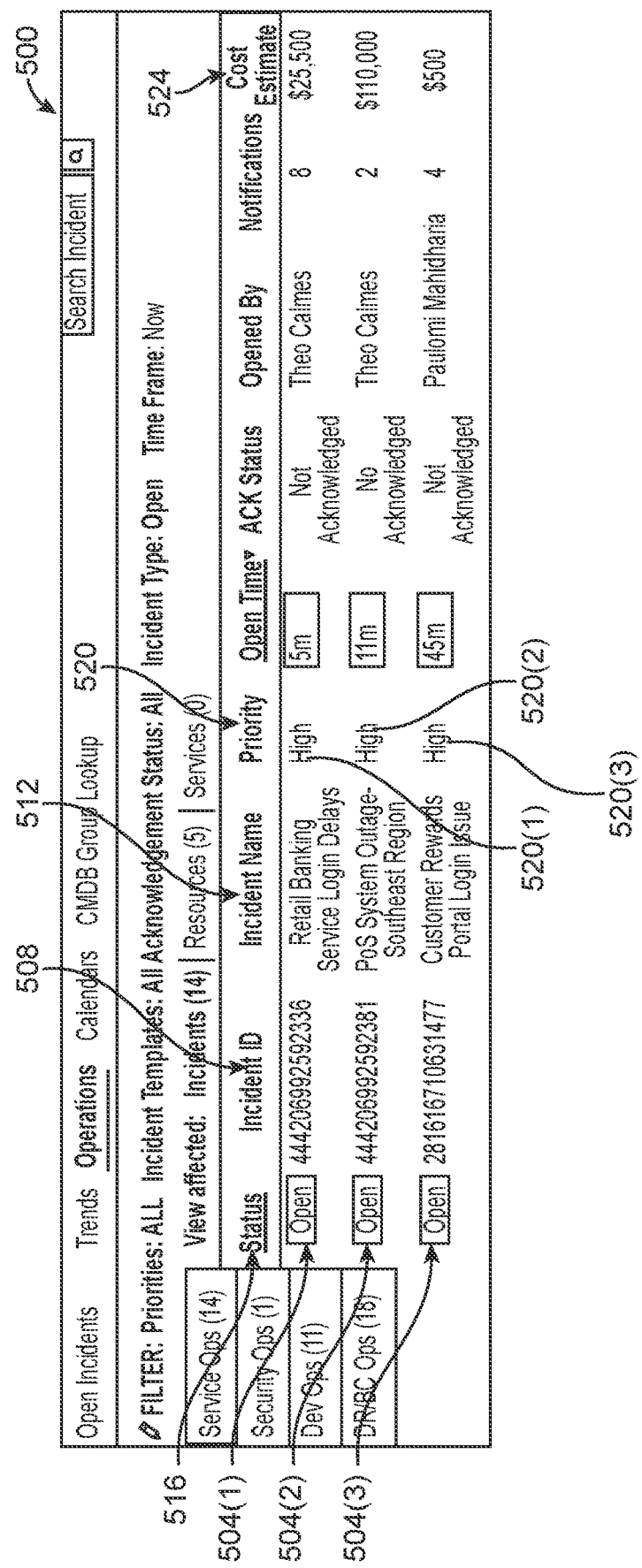
FIG. 5 is a screenshot of an example predictive-analytics GUI that allows a user to view and/or change one or more predicted attributes of one or more currently open critical events.

As discussed above, predictive critical-event models of the present disclosure can be used to predict one or more attributes of a newly arriving critical event using automatic machine classification and/or regression to compare attributes of a newly arriving critical event to one or more models built using historical critical-event data. FIG. 5 illustrates an example predictive-analytics GUI 500 that is displaying three open critical events 504(1) to 504(3) that have been automatically classified as discussed above and elsewhere herein. Example predictive-analytics GUI 500 includes and "Incident ID" column 508 and an "Incident Name" column 512 that contain information identifying the corresponding critical events 504(1) to 504(3), along with a "Status" column 516 that are showing each of the critical events as being open. This example has two columns, "Priority" column 520 and "Cost Estimate" column 524 that contain attribute values 520(1) to 520(3) and 524(1) to 524(3), respectively, that the software predicted based on the classification and/or regression of critical events 504(1) to 504(3) when they arrived into the CEM system (not shown).

Predictive-analytics GUI 500 may be configured to allow a user to update a predicted value as the user believes necessary. For example, if the user deems the that the predicted "High" priority value 520(3) of critical event 504(3) in "Priority" column 520 to be too high—e.g., based on the relatively low cost estimate in "Cost Estimate" column 524, the user may change that priority value. As those skilled in the art will readily appreciate, predictive-analytics GUI 500 may be configured to do this in any one or more of a variety of ways. For example, priority value 520(3) may be a hyperlink that opens a priority-selection dialog box (not shown) wherein the user can select a different priority value. As another example, incident name 512(1) in "Incident Name" column 512 may be a hyperlink that, upon selection, opens another window, dialog box, etc., that displays information about critical event 504(3) and allows the user to change one or more attribute values, including priority value 520(3). Those skilled in the art will readily appreciate that predictive-analytics GUI 500 is merely illustrative and that there are many ways of displaying predicted attributes of newly arriving critical events.

Those skilled in the art will also readily understand that predictive-analytics GUI 500 may be provided by any suitable predictive-analytics software, such as software that is part of a CEM software system or that can access critical event data, such as may be stored and maintained by a CEM software system. Those skilled in the art will understand that while predictive-analytics software can be part of a CEM software system, fundamentally there are no constraints on how predictive-analytics software can be deployed in the context of critical event data.

1.6. Critical-Event Prescriptive Analytics

Figure 6A:
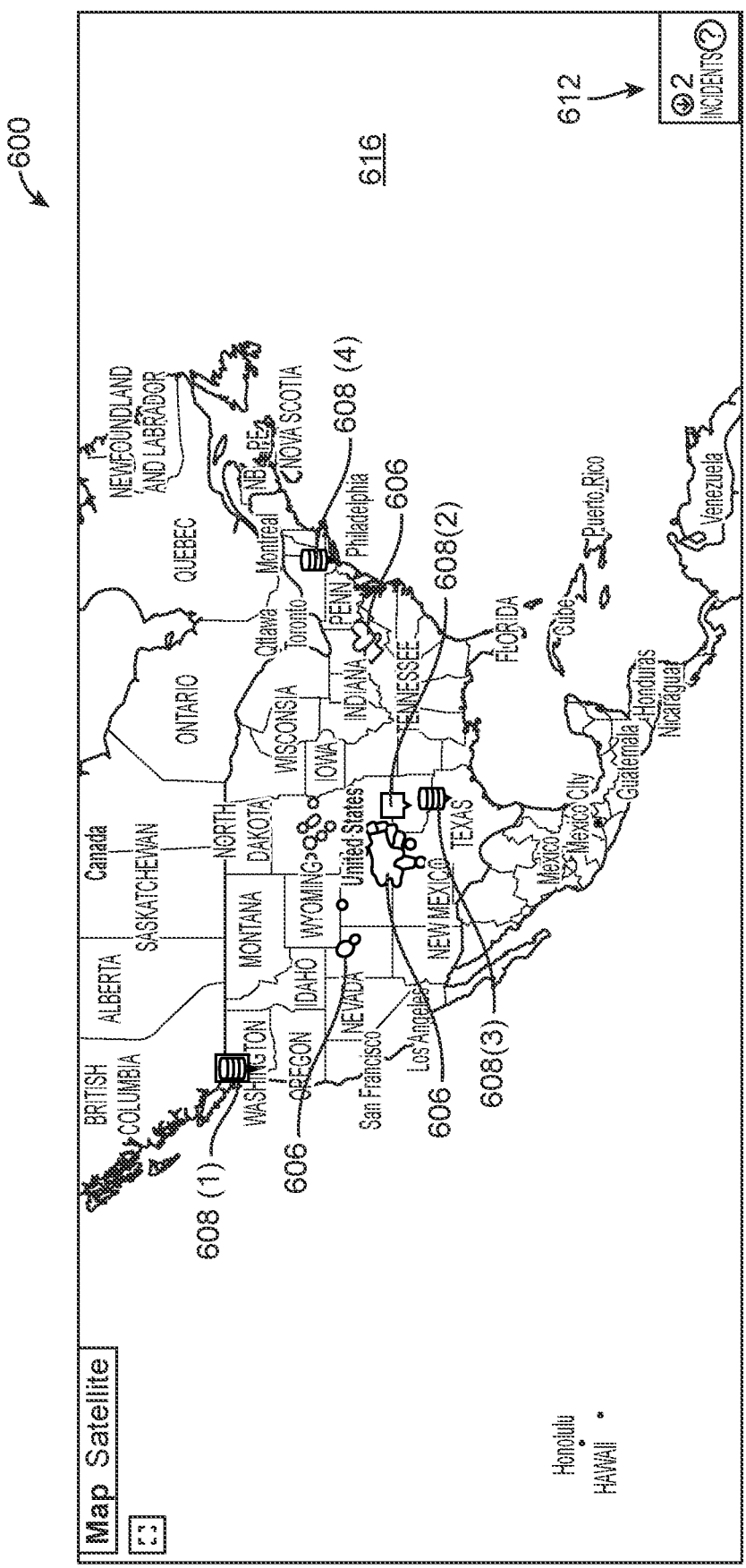
FIGS. 6A to 6E are a series of screenshots of an example prescriptive-analytics GUI that allows a user to view, interact with, and control responses to one or more current critical events, including viewing and selecting one or more automatically prescribed response actions and/or response protocols.

As also discussed above, predictive critical-event models of the present disclosure can be used to prescribe actions and/or resources for resolving newly arriving critical events using automatic machine classification and/or regression to compare attributes of a newly arriving critical event to one or more models built using historical critical-event data. FIGS. 6A to 6E illustrate an example prescriptive-analytics GUI 600 (Analytics Dashboard GUI) in the context of an example critical event involving a malware attack on a server. Referring first to FIG. 6A, in this example, prescriptive-analytics GUI 600 is displaying a map 604 that shows IT resources owned or controlled by a particular organization. In this example, prescriptive-analytics GUI 600 is part of a CEM software system (not shown) utilized by the organization to manage critical events—including IT incidents, as illustrated here—that the organization experiences. It is noted that map 604 may be a regional map or a worldwide map and may be interactive so as to allow a user to pan, scroll, zoom, etc., to control the view of the map, as is known in the art. Map 604 may include one or more user-controllable overlay layers. Here, map 604 is displaying two overlay layers, namely a weather layer that is displaying weather events 606 and a datacenter layer that is displaying all of the organizations datacenters within the current view of the map. In this example, map 604 shows datacenter icons 608(1) to 608(4) corresponding to four datacenters—one in Washington, one in Oklahoma, one in Texas, and one in New York. Those skilled in the art will understand that the same weather-event and datacenter information can be displayed in ways other than using differing layers, such as using and one or more of a variety of display-filtering methods, among others.

Of the four datacenters, the Washington datacenter and the Texas datacenter are without current incident (e.g., corresponding icons 608(1), 608(3) colored green), the Oklahoma datacenter has a lower-priority incident occurring (e.g., corresponding icon 608(2) colored yellow), and the New York datacenter has a high priority incident occurring (e.g., corresponding icon 608(4) colored red). In this example, not only does the prescriptive-analytics GUI 600 display the datacenter icons 608(1) to 608(4) in differing colors to identify critical events, but it also provides an events indicator 612 at the lower right-hand corner of a display window 616 that displays certain events, here, the number of critical events occurring at the New York datacenter (icon 608(4)). Events indicator 612 may be a control that, for example, opens another screen or window or otherwise displays information (not shown) concerning the corresponding current critical event(s).

In this example, each of the datacenter icons 608(1) to 608(4) is a control that a user can select (e.g., by right-clicking, double-clicking, touching the screen, etc.) to view additional information associated with that datacenter and/or critical event(s) that the corresponding datacenter may be currently experiencing. Consequently, while viewing display window 616, a user can select any one of these icons to view such additional information. In this example, the user selects the New York datacenter icon 608(4), and upon receiving the selection, prescriptive-analytics GUI 600 displays screen 620 of FIG. 6B. GUI 600 may also display screen 620 of FIG. 6B in response to the user selecting events indicator 612 (FIG. 6A), among others.

Figure 6B:
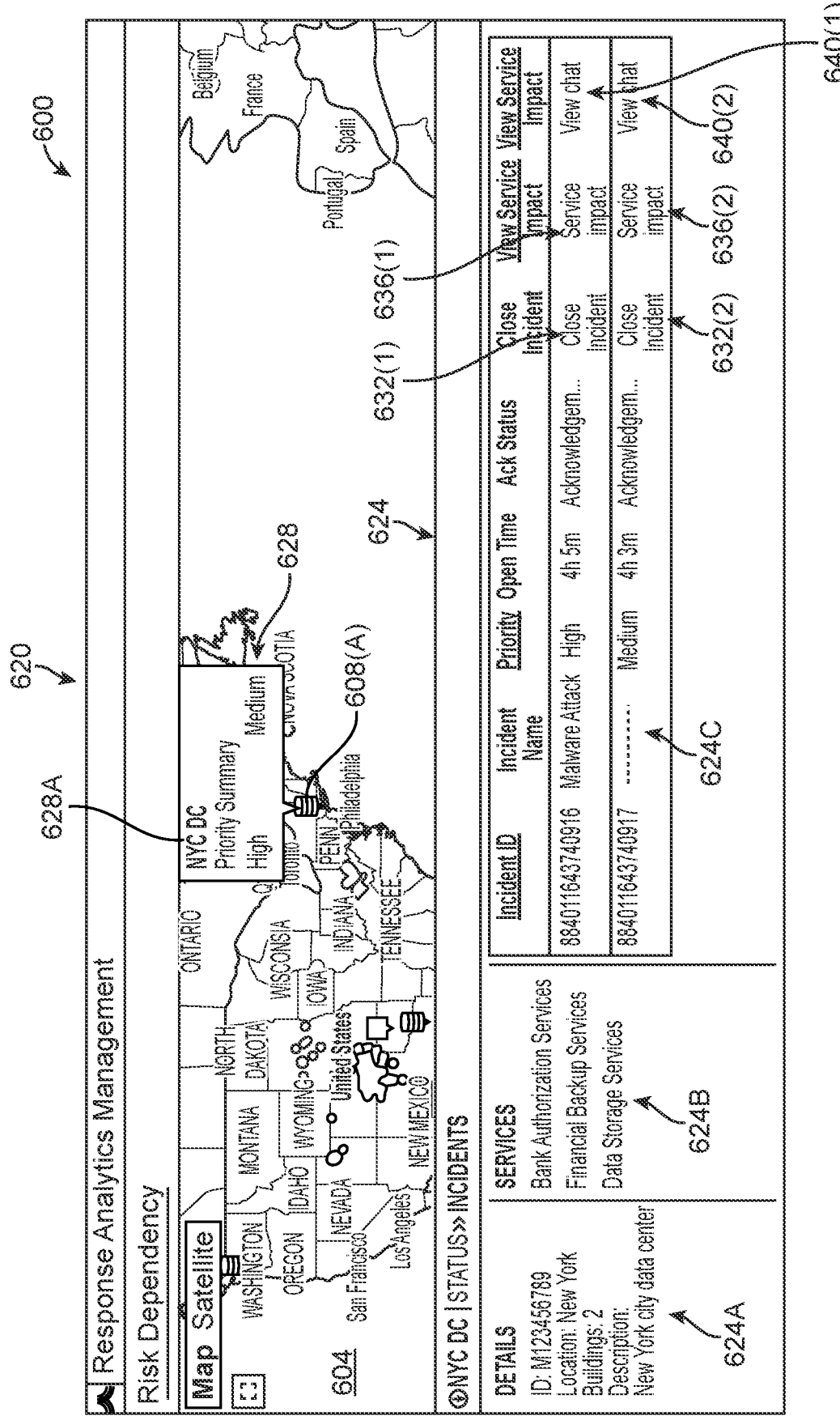

Referring to FIG. 6B, in this example, screen 620 is a split screen that shows map 604 in an upper region and critical-event information 624 for the selected New York datacenter in a lower region. Screen 620 includes a popup window 628 above New York datacenter icon 608(4) that indicates the user's selection of that icon. Popup window 628 contains information about the New York datacenter, including a priority summary that indicates that this data center is currently experiencing two critical events, one of high priority and one of medium priority. Popup window 624 also includes a "Details" control 628A that, upon user selection, causes predictive-analytics GUI 600 to display critical-event information 624 in the lower-portion of screen 620.

In this example, critical event information 624 includes datacenter information 624A, services information 624B, and a critical-event table 624C. Services information 624B contains a list of services that rely on the New York datacenter and could be impacted by one, the other, or both of the critical events that the New York datacenter is current experiencing. Knowing the data center and/or IT resource(s) impacted by the current critical events, the CEM software system may utilize a configuration management database (CMDB) (not illustrated, but see, e.g., FIG. 14) to determine the services prescriptive-analytics GUI 600 lists in services information 624B. In this example, critical-event table 624C contains information about the currently active critical events at the New York datacenter and give the user controls to take certain actions.

For example, critical-event table 624C includes: "Close Incident" controls 632(1) and 632(2) that allow the user to close the corresponding critical event; "Service Impact" controls 636(1) and 636(2) that allow the user to view a corresponding service-dependency graph that graphically shows the impact of that critical event (see FIG. 6C, described below); and "View Chat" controls 640(1) and 640(2) that allow the user to open a chat window (not shown) where resolution-team members and/or others may be discussing the corresponding critical event and its resolution. In this example, the user selects "Service Impact" control 636(1) for the high-priority "Malware Attack", which causes prescriptive-analytics GUI 600 to display screen 644 of FIG. 6C that includes a service-dependency graph 648.

Figure 6C:
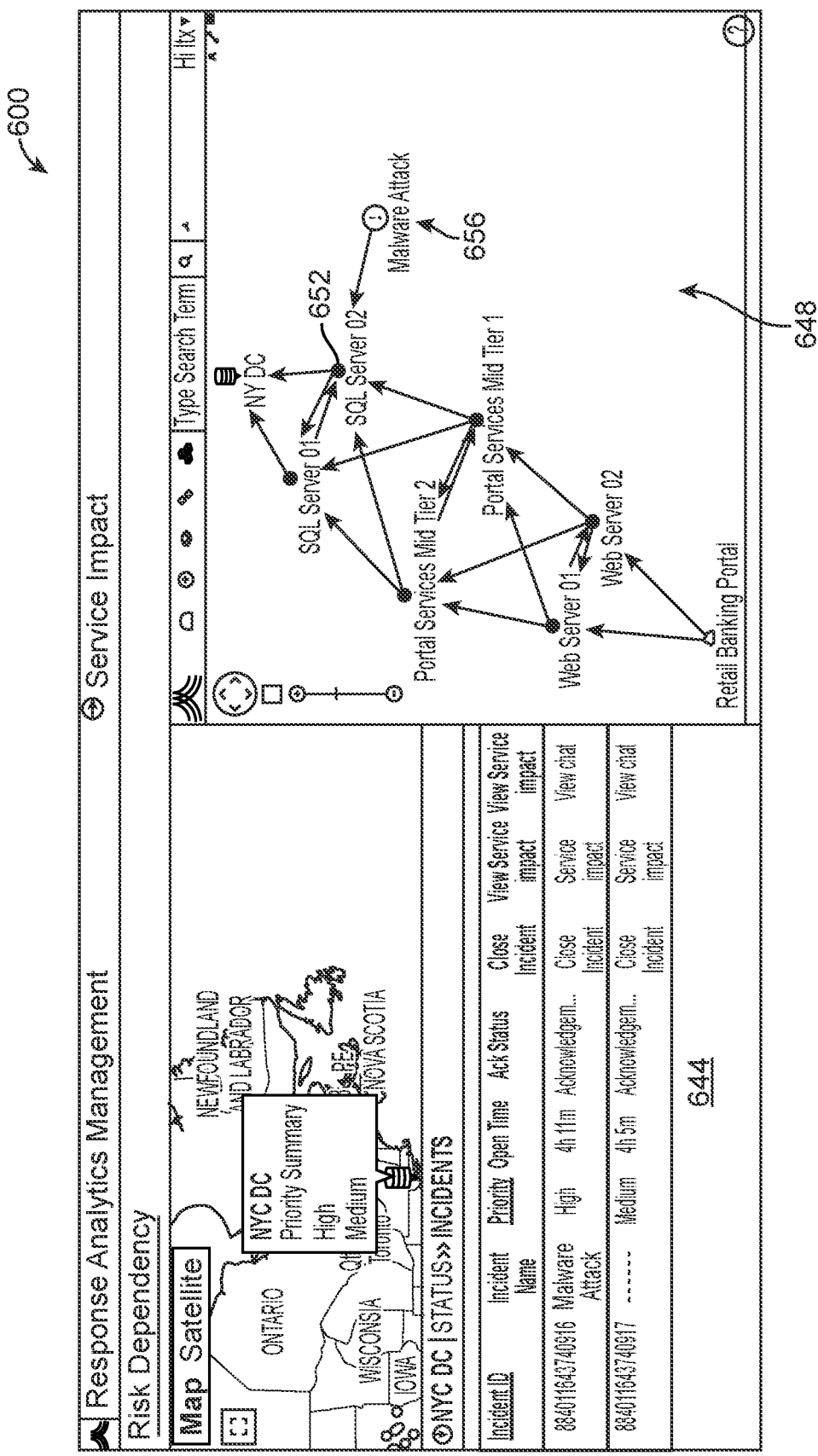

Referring now to FIG. 6C, in this example, prescriptive-analytics GUI 600 displays service-dependency graph 648 on a right-hand portion of display screen 644. The CEM software system again utilizes data in the CMDB to allow prescriptive-analytics GUI 600 to construct service-dependency graph 648. In this example, service-dependency graph 648 contains various icons (here, circles, cloud, and stacked disks) representing services and IT resources relating to the impacted New York datacenter, along with corresponding labels (e.g., "NY DC", "SQL Server 01", etc.). Also in this example, prescriptive-analytics GUI 600 colors the icons to represent the level to which the corresponding services/IT resources are affected by the "Malware Attack" critical event at the "SQL Server 02" server. Here: icon 652 of "SQL Server 02" is colored red to indicate that this server is severely operationally impacted; the icons for "Retail Banking Portal", "Web Server 01", "Web Server 02", "Portal Services Mid Tier 1", and "Portal Services Mid Tier 1" resources/IT services are all colored yellow, indicating they are affected but still operational; and the icons for "SQL Server 01" and "NY DC" are colored green to indicate that they are operating without impact. In this scenario, "SQL Server 01" and "SQL Server 02" are redundant of each other, such that losing one of them will not shut down the downstream services/IT resources. Rather, the speed at which they can operate may be slowed. This is why "Retail Banking Portal", "Web Server 01", "Web Server 02", "Portal Services Mid Tier 1", and "Portal Services Mid Tier 1" resources/IT services are colored yellow. For ease of user identification of the critical event, the "Malware Attack" critical event is represented by critical-event indicator 656.

Figure 6D:
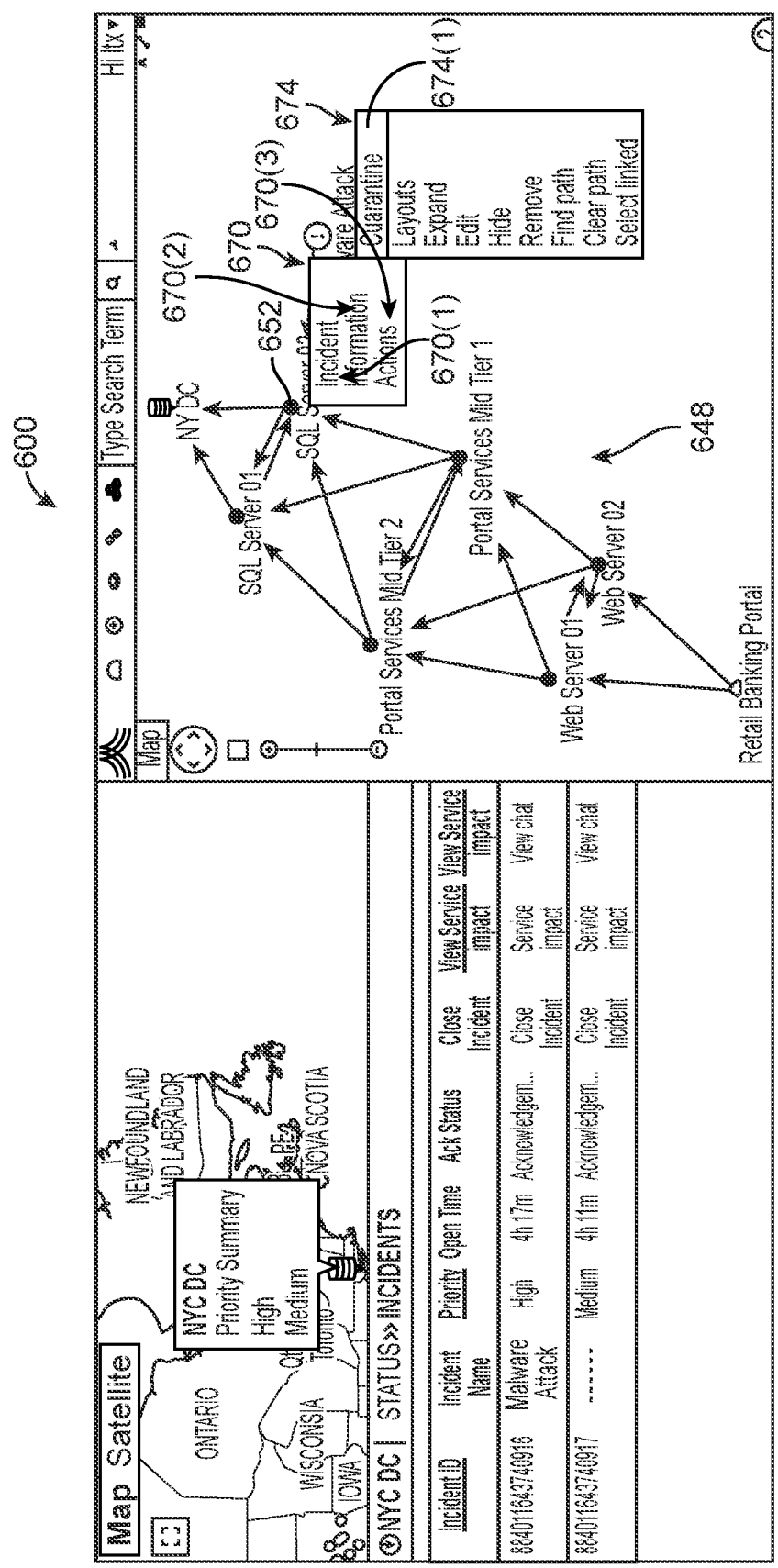
Figure 6E:
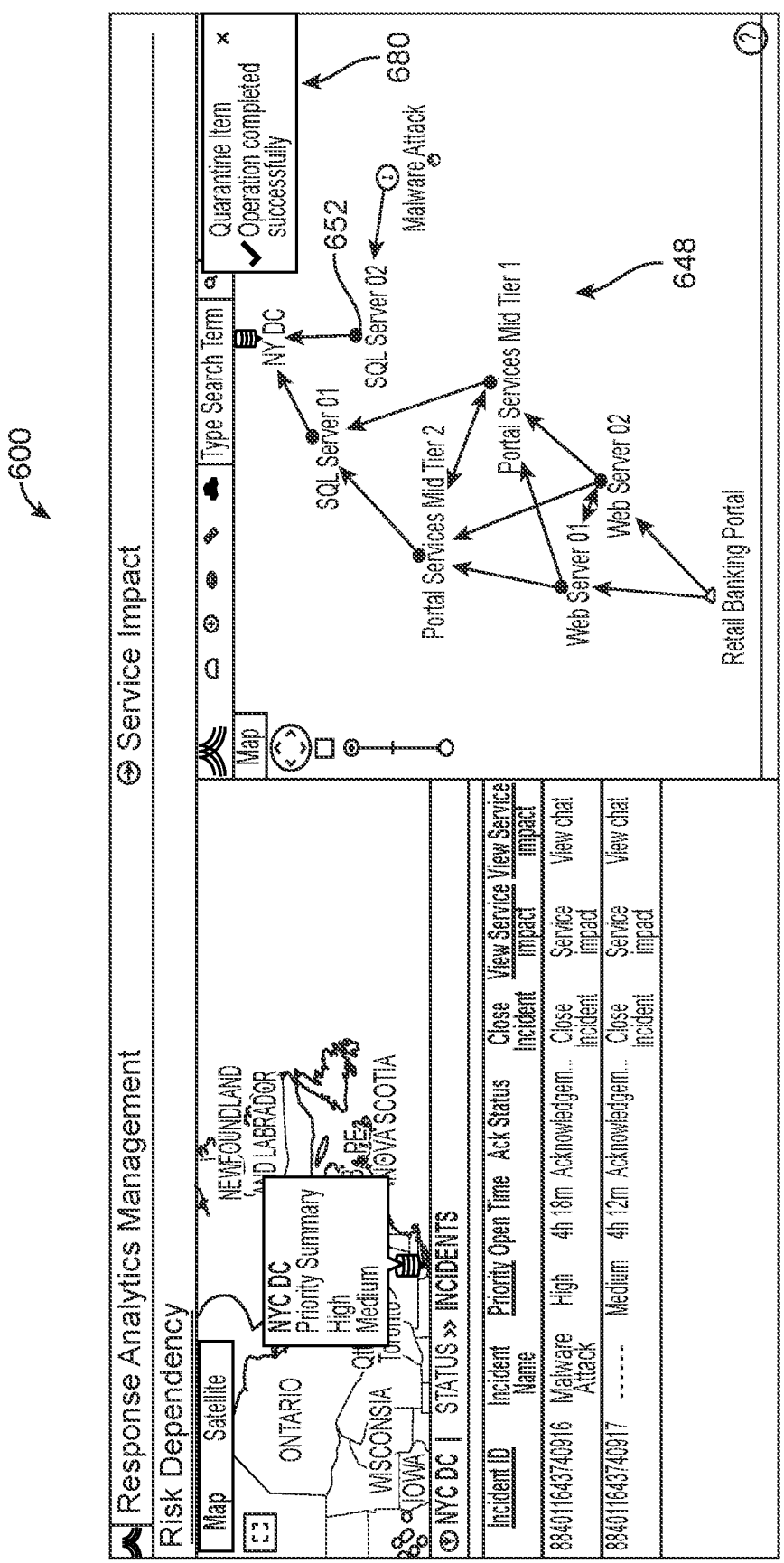

Each icon, including icon 652 for the "SQL Server 02" server hit by the malware attack, may be a control that allows a user to select it, such as by right-clicking, double-clicking, screen-tapping, etc. Upon selection, prescriptive-analytics GUI 600 displays relevant information. For example and as seen in FIG. 6D, when the user selects icon 652, prescriptive-analytics GUI 600 may display a popup window 670 or other graphical device that provides several selectors, here, an "Incident" selector 670(1), an "Information" selector 670(2), and an "Actions" selector 670(3). In this example, "Actions" selector 670(3), upon user selection, causes prescriptive-analytics GUI 600 to display another popup window 674 or other graphical device that contains user-selectable actions in the form of a "Quarantine" selector 674(1), among others. Both of these actions are prescriptive actions that the CEM software system suggests based on the classification and/or regression performed using one or more predictive models as discussed above. For example, the CEM software may recommend these actions based on historical data that shows that they are the two most effective actions to minimize TTR and/or cost impact, perhaps among other criteria. Prescriptive-analytics GUI 600 may display these suggested actions in order of performance (e.g., lowest TTR, lowest cost, etc., or combination of such factors), for example, with the best (better) performing action at the top of the list. The CEM software system may be configured so that upon user selection of an action (here, the quarantine action by user selection of "Quarantine" selector 674(1)), it automatically performs the action. For example, the user selection of "Quarantine" selector 674(1) may cause the CEM software system to execute corresponding quarantine software instructions (not shown) that cause the "SQL Server 02" server to be quarantined. Indeed, in this example, the user has selected "Quarantine" selector 674(1) and the CEM software system has automatically quarantined the "SQL Server 02" server. Correspondingly and for example, once the CEM software system knows that the "SQL Server 02" server is quarantined, prescriptive-analytics GUI 600 may update service-dependency graph 648 to show that the "SQL Server 02" server has in fact been quarantined. This is illustrated in FIG. 6E, in which prescriptive-analytics GUI 600 has changed the color of icon 652 to white and has removed certain ones of the data-flow arrows. In this example, prescriptive-analytics GUI 600 also displays an action status indicator 680, here indicating that the quarantine of the "SQL Server 02" server was successful. Once the user has selected "Quarantine" selector 674(1), the CEM software system may update the data for the current "Malware Attack" critical event to indicate the fact that the user, and consequently the CEM software system, utilized the quarantine action. This data can then be used in future running of a pattern-recognition and/or predictive-modelling processes to inform the corresponding patterns and models.

Those skilled in the art will also readily understand that prescriptive-analytics GUI 600 may be provided by any suitable prescriptive-analytics software, such as software that is part of a CEM software system or that can access critical event data, such as may be stored and maintained by a CEM software system. Those skilled in the art will understand that while prescriptive-analytics software can be part of a CEM software system, fundamentally there are no constraints on how prescriptive-analytics software can be deployed in the context of critical event data.

2. Example Implementation 2.1. Cognitive Response Management Subsystem for a CEM Management Software System In some aspects, this disclosure is further directed to Analytics Dashboards and underlying cognitive functionality for CEM software systems. As used herein and in the appended claims, an "analytics dashboard" and like terms refers to any GUI that is involving the display of data and/or representations thereof that results from application of one or more pattern-recognition algorithms, one or more predictive-modeling algorithms, and/or one or more critical-event-classification and/or regression algorithms and/or involving features that allow a user to annotate critical event data with additional data for use in the pattern-recognition and/or modeling processes. Examples of such processes and Analytics Dashboard GUIs are described above in sections 1.1 to 1.6.

Analytics dashboards and cognitive functionalities of the present disclosure assist user organizations with improving their handling of critical events, including, but not limited to reducing the organizations' TTRs of critical events, improving response efficiency, improving response effectiveness, assigning optimal priorities to critical events, automating response actions, and predicting attributes of newly arriving critical events, among others. When critical events, such as IT incidents, weather disasters, cyber-attacks, mass shootings, accidents, and explosions, among others, occur, organizations require the right resources to be notified in the fastest time. Then they need the right resources (e.g., tools, personnel, equipment, etc.) and/or automated steps to optimally resolve each critical event. Many organizations use a CEM software system, such as the Everbridge CEM system available from Everbridge, Inc., Burlington, Massachusetts, to assist them with managing their critical events. Commercially available CEM systems are typically, but not necessarily, multitenant systems having multiple organizations as the tenants, each of which may have many users that are typically personnel and executives of the various organizations.

During a critical-event lifecycle, there are a number of questions at each step, such as, "is this new critical event necessary or can it be combined with other similar critical events being resolved?", "is this critical event launched with right priority and right impact?", "are all relevant resources notified, and if yes, is it the best team?", "does the team have the best analytics, historical information, and steps for faster resolution?", and "can all or part of resolution steps be executed in an automated way?", among others, that should be asked to provide the organization with the best chance for successful and efficient resolution of the critical event. A Cognitive Response Management (CRM) subsystem of the present disclosure, which can be incorporated into a CEM software system, can be configured to address all of these questions and/or others by providing one or more GUI-based Analytics Dashboards supported by various machine-based cognitive functionalities. Judicious use of such an Analytics Dashboard by knowledgeable users can improve an organization's CEM response time, TTR, and response effectiveness and can reduce costs and disruption, among other things.

Figure 7:
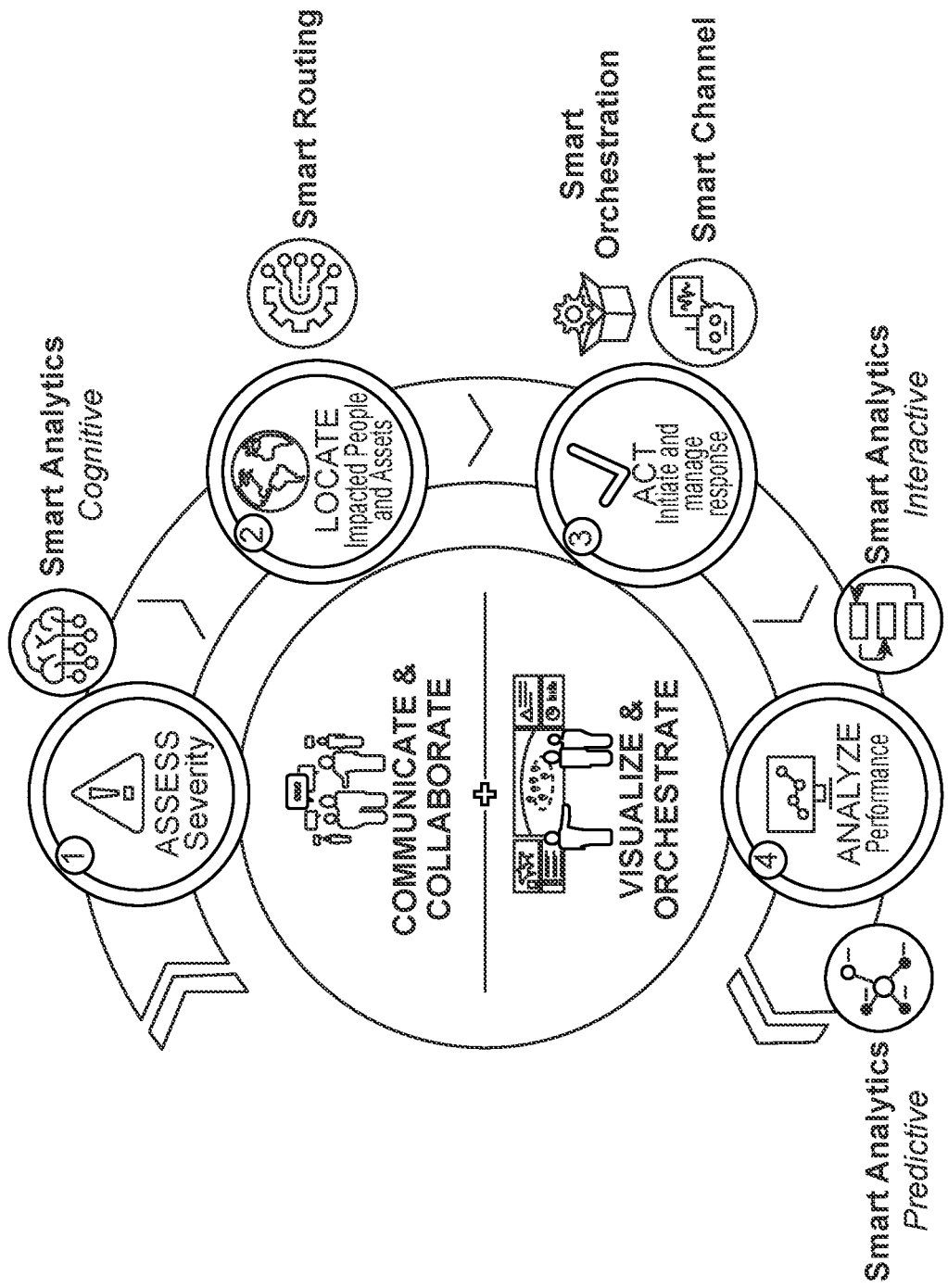
FIG. 7 is a diagram illustrating the four phases of handling an information technology (IT) incident, illustrating roles that pattern recognition ("Smart Analytics Cognitive"), predictive modeling ("Smart Analytics Cognitive") and corresponding predictive analytics ("Smart Analytics Predictive") and prescriptive analytics ("Smart Analytics Interactive") can play in the four phases.

A CRM subsystem of the present disclosure can assist organizations in responding to critical events in interactive, prescriptive, and/or predictive manners for any type of critical event, including supporting the four stages of IT-alerting incident-response lifecycle, as illustrated in FIG. 7 in the context of IT incidents (see, e.g., the "Cognitive", "Interactive", and "Predictive" labels in FIG. 7 that correspond to the like functionalities described herein). During the process, the CRM subsystem and its Analytics Dashboard can, for example, augment information concerning a critical event and/or predict the most effective response parameters for responding to a critical event by leveraging machine learning to assist knowledgeable users and/or the user organization in providing a faster resolution to the critical event.

In some embodiments, a CEM system augmented with a CRM subsystem of the present disclosure provides several unique and new capabilities for managing critical events. For example, it can quickly notify (e.g., through one or more modalities and delivery paths) the experts that the CRM subsystem has determined are most qualified to resolve a particular critical event. Based on input from a CRM subsystem of the present disclosure, the CEM system can arrange for the most-appropriate experts to collaborate, for example, in smart channels and in an on-call-schedule-aware fashion. A CRM subsystem of the present disclosure can efficiently optimize responses to new critical events using a "Cognition Engine" to learn how each user organization has responded to historical critical events and use that knowledge to, among other things, predict attributes of the new critical event, suggest optimal response teams, suggests optimal resources, and automate actions, among other things. As used herein and in the appended claims, the term "Cognition Engine" and like terms are used as functional terms to describe the software used to generate one or more predictive models, including pattern-generation software that can be used to determine attributes that may be conducive to modeling, and the software used to classify critical events based on the one or more predictive models. Examples of such software are described above in sections 1.1 to 1.6.

For example, a Cognition Engine of the present disclosure can be configured to predict how the process of responding to a critical event is likely to pan out. For each user organization of a CEM system enabled with a CRM subsystem of the present disclosure, the Cognition Engine will have learned how that organization has tended to respond to critical events in the past and will use that learning to predict the outcome of a newly arriving critical event with matching or nearly matching attribute combinations. In some embodiments, the CRM subsystem guides each user organization through a three-step process:

1. It can display one or more charts, such as pattern clustering charts, that will give them insights into how each of their sub-teams is handling different types of events, for example, fire alarms on a weekend during winter on the West Coast, or cyber-attacks in early morning in "Datacenter-6." From studying these patterns, knowledgeable users may decide to retrain some teams to follow the best practices of better performing teams. Or they may decide to invest resources differently.

2. It can display predictions about how newly arriving events are likely to unfold. For example, when a new critical event arrives, the CRM subsystem compares that event's attributes (source, time of day created, severity, etc.) to any patterns that it uncovered during a learning phase. While learning, the CRM subsystem might have found, for example, that critical events reported by "monitoring-tool-A" in "Datacenter-2" get scant attention. When a new critical event comes from "monitoring-tool-A" in "Datacenter-2" arrives, the CRM subsystem may predict that the time to resolution for that critical event will likely be greater than 72 hours. In another example, the CRM subsystem may project that a new critical event affecting a firewall configuration item will take at least 120 hours, because the CRM subsystem has learned that pattern from its study of the Configuration Management Database (CMDB).

3. It can optionally guide a user organization through the response process, recommending taken different actions, changing priorities, or reassigning teams.

These and other capabilities of a CEM system enhanced with a CRM subsystem of the present disclosure are described and exemplified below.

2.1.1. Interactive Response Management Capabilities

A CEM system that includes a CRM subsystem as described herein can provide any one or more of a variety of capabilities that interactively assist users during critical event management through any one or more of a variety of differing collaboration tool interfaces, including, but not limited to, SLACK® and SPARK™ collaboration tool interfaces, among others. Examples of these capabilities include:
  guiding a knowledgeable user through a response to an incident;
  extracting detailed information about an event, engaging the right resources, and assisting in the quick resolution of an incident;
  interacting with a Schedule Management subsystem (see section 2.1.7.4, below) to assemble the right team based on their availability schedules;
  interacting with a CMDB Synchronization subsystem (see section 2.1.7.2 below) to provide a service dependency graph based on different attributes like services, location, priority, etc., of the critical event in order to:
    analyze the impact and predict the cost on the event; and
    identify the right set of people to work with;
  augmenting critical event with information from weather, news, geotagging, social media sources, etc.;
  gathering user input to enrich the information about the critical event;
  interacting with predictive models to:
    provide insights to the user on the estimated time to resolve based on historical data; and provide recommendation on the people that could be involved to resolve the incident based on historical data;

interacting with an Orchestration subsystem (see section 2.1.7.5, below) to:

provide life-cycle interaction;

source very detailed information about critical events into the CEM system; and monitor the acknowledgement by the people on the critical event management; and informing users about clustering of related events, and joining and/or streamlining the groups that had been working disparately on the individual critical events.

2.1.2. Cognitive Capabilities ("Assess" and "Analyze")

A CRM subsystem as described herein can analyze how users of a CEM system are responding to their critical events, which allows the CEM system and/or its users to determine how responses can be improved. Such a CRM subsystem can have any one or more of a variety of cognitive capabilities that can enhance the performance of the CEM system, use resources more efficiently and effectively, and reduce the time it takes to resolve an incident. In some embodiments, the CRM subsystem includes a Cognition Engine (see section 2.1.7.6, below, for more details) that learns about how each organization organizational user using a CEM system of the present disclosure responds to critical events. In some embodiments, the Cognition Engine audits the critical event response processes of the one or more organizational users and records a variety of numerical metrics about, the collaboration effort around, and the attempted resolution for, each critical event. Examples of such information that the Cognition Engine records include:

number of people involved in resolving each incident;

length of time taken to resolve each incident;

tools used in resolving each incident;

skills required for resolving each incident;

shifts scheduled;

smart collaboration channels used by the incident responders;

environmental influences affecting the incident and its resolution;

delivery modalities used;

attributes read through integration with the CEM system's CMDB synchronization subsystem;

competing workload;

smart conferences;

attributes read through the CEM system's differentiated integrated platform as a service (iPaaS) system for sourcing critical events; and temporal factors, among others.

As described in more detail below, in some embodiments the CRM subsystem uses an analytics data repository ("analytics table", for simplicity) to record a combination of metrics as a matrix score for each critical event that may be stored in a history vault of the CEM system. The CRM subsystem feeds the metrics into one or more various machine-learning algorithms, that may include, but not be limited to, a K-means clustering algorithm and a Gaussian Mixture Model algorithm, to find patterns in the data.

In some embodiments, the CRM subsystem uses an Analytics Dashboard to display, for example using one or more charting algorithms, any discovered patterns and to highlight any anomalies that deviate from patterns discovered. The CRM subsystem may also classify and categorize responses to critical events and display this information to a user. In this way, the CRM subsystem can clearly convey to a user of a user organization, such as an executive of the organization, which aspects of any of the organization's critical event response processes are working best. By discovering differences among regions, teams, channels, etc., and displaying this information to a knowledgeable user, the CRM subsystem can assist the user with improving any weaker parts of the organization's process. The CRM subsystem can use the cognitive findings as inputs, for example, for:

more optimal scheduling;

automating responses to critical events (for example, the CRM subsystem may have integration to tools, such as ANSIBLE TOWER® software, for executing RUN-BOOK™ automation (RBA) scripts);

priority changes;

question-and-answer sessions with users through an Interactive Response Management subsystem (see section 2.1.7.1, below); and reassigning teams, among others.

The CRM subsystem may also use cognitive findings as inputs to a rules engine component of the Cognition Engine. Sometimes patterns emerge that illustrate a stark difference in how critical events have been responded to. For example, a West-coast resolver team may almost always close network-related IT incidents much faster than an East-coast resolver team. In such cases, the rules engine may codify rules from these learnings. The CRM subsystem can optionally enforce these rules on new critical events, for example, automatically assign them to a stronger team instead of the default of assigning them based on on-call scheduling.

In some embodiments, the CRM subsystem can assist with assessing whether or not multiple critical events seem to be related because they occur in related timeframes and geolocations, have similar priorities, and/or they impact overlapping areas of the service dependency graph, among other things. For example, the CRM subsystem can highlight these patterns in an analytics-dashboard display so that a knowledgeable user can assess whether or not the relations are valid, and the knowledgeable user can decide whether or not the relationships should be promulgated or not. For example, the Interactive Response Management subsystem (see section 2.1.7.1, below) may be configured to guide the user through a workflow that (a) gathers these events under a single umbrella "situation" object and (b) streamlines the groups that had been working disparately on the individual critical events.

2.1.3. Prescriptive Capabilities

A CRM subsystem as described herein can assist with assessing new critical events based on learning from historical critical events and recommend best practices for responding to each critical event. While the Cognition Engine is converting the response process into structured scores in the cognitive phase described above, it can also be configured to allow a user to label critical events using hindsight. For example, the user can affix one or more of several labels to an event as a way of training the system about desirable or undesirable outcomes. As non-limiting examples, the Cognition Engine may include labels for critical events:

that proved too costly to resolve and not worth the return on investment (ROI).

that were not resolved quickly enough for his liking and caused a major disruption to the business. By using a label such as this, the user can guide the system to goal-seek a shorter TTR.

where the client was very satisfied with the handling.

that recurred too frequently.

that were given too low, or too high, a priority rating.

Using one or more machine learning algorithms including, but not limited to, a random forest algorithm and a support vector machine algorithm, a CRM subsystem of the present disclosure can study how these labels are associated with the process metrics (described above), and therefore, be continuously trained about key factors that were present when a particular critical event was handled well or poorly. In this way, those process attributes, such as number of people involved, length of time taken, and tools used, become more than just interesting metrics for pattern analysis; they become predictive indicators modeling the behavior of critical events. This training may be recorded as predictive models, and the user can use the CRM subsystem to build different predictive models for various combinations of labels, algorithms, and data sets.

With user selection, the CRM subsystem can use the predictive models to predict the likely outcome of new critical events as they arrive. In addition, the CRM subsystem can use the predictive models in a cognitive, rather than prescriptive, way by classifying newly arrived critical events as being similar to other critical events. In addition to triggering informative alerts, the CRM subsystem can use the predictions to guide response to the newly arrived critical events. The predictions can be used as inputs, for example, for, more optimal scheduling, automating responses, priority changes, question-and-answer sessions with users through the Interactive Response Management subsystem, and re-assignment of teams, among other things.

After a critical event has been resolved, a team of experts will often conduct a post-mortem on multiple incidents to determine any number of things, such as whether or not the precipitating critical events were properly handled by the CEM system and responders, including whether or not the CRM subsystem properly related the critical events to one another. During a post-mortem meeting, the team can interact with the CRM subsystem to flag critical events that turned out to be related. As described above, the CRM subsystem can often suspect events as being related, but this actual confirmation by a user is very important for the learning process. Once the team has properly labeled the precipitating critical events, the Cognition Engine uses machine learning algorithms to train the predictive models.

2.1.4. Simulation Capabilities

A CEM system that includes a CRM subsystem as described herein can be configured to run any one or more of a variety of simulations. For example, in some embodiments, a CEM system of the present disclosure can be used to simulate the effects of different investments in critical event response strategies and/or tools. As other examples, a CEM system of the present disclosure can be used to project "what-if" scenarios based on, for example, time zones, staffing levels, team skill, and so forth.

2.1.5. Operation of an Example CRM Subsystem

Figure 8:
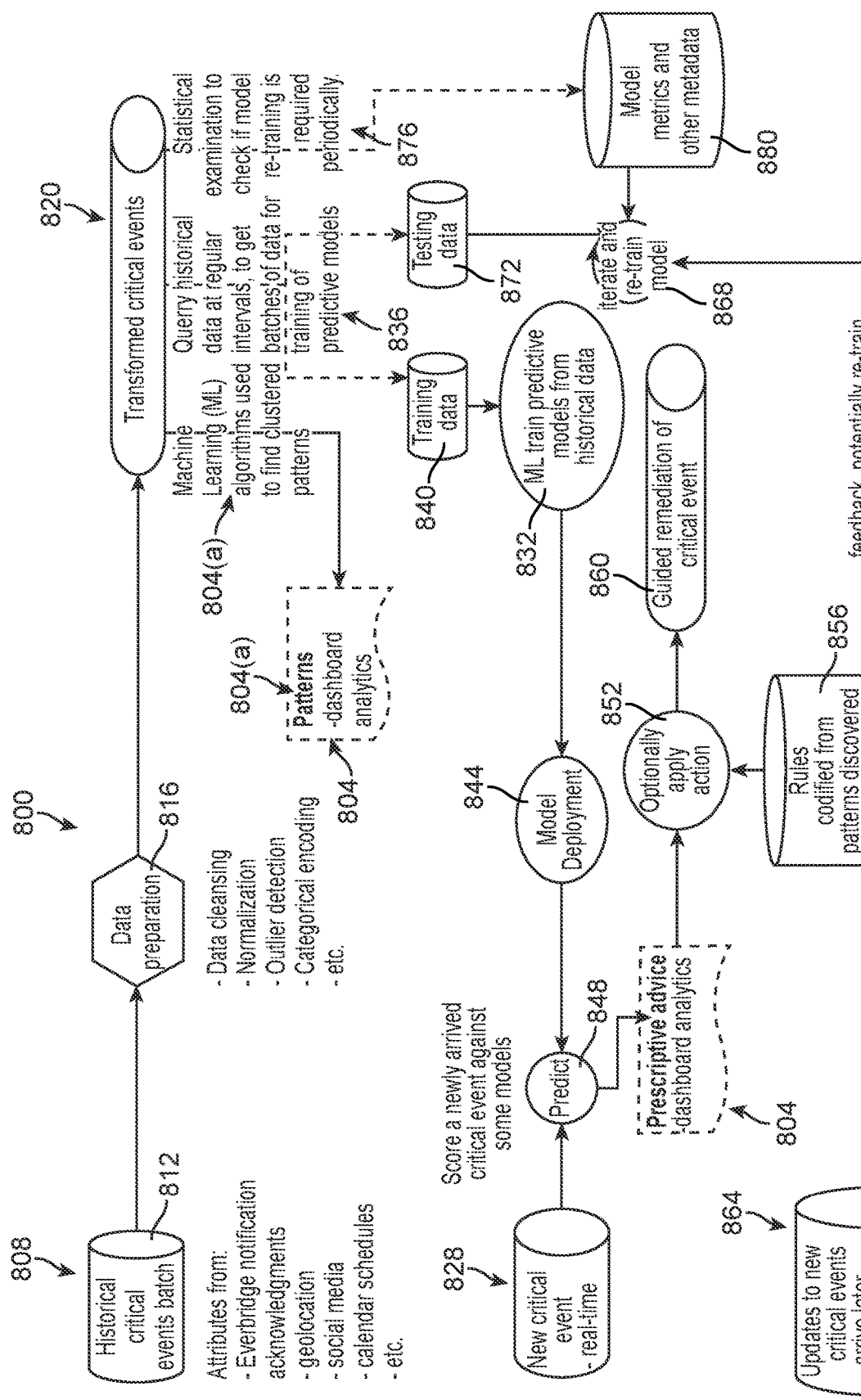
FIG. 8 is a diagram illustrating an example implementation of predictive and prescriptive analytics in a critical event management (CEM) system.

FIG. 8 illustrates the operation of an example CRM subsystem 800 of the present disclosure. In this example, the operation is described in terms of operations performed on various classes of critical events and performed through an Analytics Dashboard 804 in which CRM subsystem 800 presents various information to a user and, for some operations, allows the user to interact with the CRM subsystem, for example, to allow the user to assist in training predictive models that the CRM subsystem generates and to allow the user to accept, modify, or override suggestions the CRM subsystem makes for responding to a new critical event. Screenshots of an example Analytics Dashboard are described below. First, however, cognitive functionality underlying an Analytics Dashboard of the present disclosure is first described.

One of the classes of critical events is historical critical events 808 that the organization responded to in the past and that are stored in a critical event archive 812 in association with the corresponding user organization. Critical event archive 808 may be part of the CEM system (not shown) of which CRM subsystem 800 is a part and may be a multi-tenant datastore that contains historical critical events for multiple organizations or may be a datastore dedicated to the current organization at issue. Each historical critical event 808 may include attributes from, among other things, CEM notification acknowledgements, geolocation, social medium, and calendar schedules, among others. At block 816, data composing historical critical events 808 are prepared for use by CRM subsystem 800 as needed. For example, data preparation at block 816 may include data cleansing, normalization, outlier detection, and categorical encoding, among others. An output of the data preparation is transformed critical events 820 that are in the proper format for further use by CRM subsystem 800.

One use of transformed critical events 820 is pattern discovery to determine patterns within attributes of historical critical events 808, for each organization, that can assist a knowledgeable user associated with that user organization with evaluating one or more attributes. Such evaluation can lead to the user to devise any of a variety of improvements to the organization's responses to future critical events. Pattern discovery utilizes machine-learning algorithms 824, such as clustering and regression algorithms, to find the patterns in transformed critical events 820. Although not shown, CRM subsystem 800 may have a datastore for storing the patterns that are the outcome of learning process, and the patterns may be labeled with metadata describing the underlying data set and algorithm used.

CRM subsystem 800 displays the discovered patterns 804A to a knowledgeable user via Analytics Dashboard 804. By viewing patterns 804A uncovered during pattern discovery on Analytics Dashboard 804, a knowledgeable user can gain knowledge about historical critical events and their attributes and use that knowledge to drive improvements to the organization's management of future critical events as well as to inform the organization about its CEM strategy and implementation success. Analytics Dashboard 804 is partly driven by various algorithms, including, but not limited to static and interactive charting algorithms for charting and displaying discovered patterns to the user and/or allowing a user to interact with the charts. Example patterns that machine-learning algorithms 824 include, but are not limited to, patterns in times-to-resolution by response teams for a particular type of event, patterns in response cost by response team for a particular type of event, patterns in return-on-investment by type of event, and patterns in success of resolution by geographical region for a particular type of event, among many others.

Another class of critical events in CRM subsystem 800 is new critical events 828 that come into the CEM system (not shown) in real-time. In this example, CRM subsystem 800 is configured to provide prescriptive advice 804B to a knowledgeable user via Analytics Dashboard 804 to provide the user with historically backed information that the user can use in deciding the best course of action for responding to the new critical event. Underlying this predictive ability are predictive models (not illustrated) that CRM subsystem 800 builds at block 832 using machine-learning algorithms operating on transformed critical events 820. Such model building may be under the direction of a data scientist from each of the organizations utilizing CEM system (not shown) and, correspondingly, CRM subsystem 800. CRM subsystem 800 may store predictive models in a suitable datastore (not shown), and each predictive model may be labeled with metadata that describes the underlying data set and algorithm used.

At block 836 CRM subsystem 800 may periodically query the transformed critical events to update the predictive models for each organization to keep the predictive models current with any critical events that had been added to historical critical events 808 since the immediately previous update of the predictive models. Each time CRM subsystem 800 uses data from transformed critical events 820 to build/update the predictive models, that data is considered training data 840 for the machine-learning algorithms at block 832.

After CRM subsystem 800 has trained/updated the predictive models, at block 844 it deploys the predictive models for making predictions about new critical events 828 that arrive into the CEM system (not shown). When a new critical event 828 arrives, at block 848 CRM subsystem 800 uses the predictive models to predict certain attributes that may be compatible with the newly arriving critical event, and display those attributes as predictive advice 804B via Analytics Dashboard 804. Examples of attributes that CRM subsystem 800 may predict for a newly arriving critical event 828 include, but are not limited to, possible response team, range of likely time to resolution, and range of likely return on investment, among many others. Block 848 may include scoring of newly arriving critical events 828 using one or more scoring algorithms (not shown) that score the critical events against the predictive models.

The prediction features of CRM subsystem 800 includes a real-time scoring engine (not shown) that scores newly arriving critical events 828 against stored patterns and/or predictive models. For example, CRM subsystem 800 may determine whether a newly arriving critical event 828 fits a pattern, i.e., whether is it similar enough to any historical critical events 808 that the CRM subsystem can suggest which resolvers to assign or which orchestration workflow to use. An Interaction Response Management subsystem (not shown) can be used to double-check user approval for this kind of assignment and automation. As another example, CRM subsystem 800 may predict that this new incident will become a major incident and/or determine whether it should be reprioritized and reassigned to a higher skill-level. As part of predicting a new critical event 828 as a "major" incident, CRM subsystem 800 can give an estimate of the time and expense to resolve.

At optional block 852, CRM subsystem 800 may apply an action based on rules in a Rules Datastore 856 from which learnings from pattern recognition discovered from historical critical events 808 can be enforced as automated actions on new critical events 828 arriving into the CEM system (not shown). When CRM subsystem 800 performs optional block 852, the result is guided remediation 860 of a new critical event. Although not shown, an Interactive Response Management subsystem (not shown) may include a suitable user interface (UI) that allows a knowledgeable user to accept or override each action that Rules Datastore 856 may recommend. Example of actions that CRM subsystem 800 may apply by way of Rules Datastore 856 include, but are not limited to assembling a response team and opening a collaboration channel, among many others.

In this example, CRM subsystem 800 includes features for updating and retraining the predictive models. At block 864, which may occur via Analytics Dashboard 804, new critical events 828 are updated following resolution to provide additional intelligence to the predictive models, thereby increasing the usefulness of CRM subsystem 800. For example, at block 864, a knowledgeable user may add, via Analytics Dashboard 804, labels to various attributes of resolved critical event and/or add other data to the resolved critical event, such as the resolution of the event, the outcome of the event, to cost of the event, the time-to-resolution for the event, the return on investment for the event, and/or other post-mortem information. At block 868, CRM subsystem 800 uses the updated new event to retrain the predictive models. Retraining may also be performed periodically at block 868 using testing data 872 pulled periodically by CRM subsystem 800 from transformed critical events 820 as part of a routine updating process. In addition, in this example, at block 876 CRM subsystem 800 uses statistical examination to periodically check whether the predictive models should be retrained. This statistical examination generates model metrics and other metadata 880 that CRM subsystem 800 uses at block 868 to retrain the predictive models.

Following are some additional exemplary features of a CRM subsystem of the present disclosure.

Receive notifications of the symptoms. The CEM system of this example has application programming interfaces (APIs) and integrations with a number of external systems to create critical events. Critical events will notify appropriate people based on the given information. The CRM subsystem manages the events and provides assistance to the user. The source of the critical event can be one of the many systems that can invoke either the CEM system API or integration. Examples of such external systems include:

Application Monitoring Tools/Systems (e.g., DataDog, NewRelic, splunk, etc.)

IT service management (ITSM) systems: (e.g., ServiceNow, Remedy, Cherwell, etc.)

Manual: Application support team, operations team creates event manually based on the end user complaints and data from monitoring systems.

Internet of Things (IOT) devices: IOT systems sends alerts that can trigger critical event.

GeOC feed: Integrates with Orchestration subsystem via iPaaS.

IPAAS API: API invoked directly by external system(s).

Messenger Platform: Critical Event can be created via slack, Spark, etc.

Use Historical Critical Events to Inform Current Critical Event. As alluded to above, historical critical events are critical events (e.g., IT incidents) that, typically, the CEM system has processed on behalf of a user organization up to the time of a current event. A user organization will typically connect its IT trouble-ticketing system and IT monitoring system to the CEM system to continually feed critical events, for example, server-processor-overloaded, network-device-crashed, or application-performance-slow, among others, to the CEM system. To resolve these critical events, the CEM system performs the following functions:

Looks up CMDB Configuration Item (CI) reference information to find detailed attributes about the affected server, application, and/or network device, such as manufacturer, geolocation, model type, age, internet address, etc. The CEM system uses this information to decide which experts to notify about the problem.

Looks up calendar shift information to find out which of the resolvers on-call have the right expertise.

Sends emails, text messages, and phone calls to IT experts asking them to fix the problem.

Assembles sub-teams of experts in smart-conferences and conference-bridges to discuss potential solutions.

Sometimes can execute scripts to remediate the issue.

For each of these activities, the CRM subsystem records a detailed audit of how long they took, how many people were involved, and how many notifications were sent—scores of attributes in all. The CRM subsystem includes an analytics data repository to store all of these attributes for every critical event, per user organization, going back, for example, many months, including such details as what percentage of the people notified showed up on the conference bridge, whether a critical event first arrived in the early morning or late afternoon, how many other critical events each responder was simultaneously working on, how many resolvers acknowledged by text-message and how many by email, whether a critical event was resolved on a Wednesday or a Friday, and so forth. The CRM subsystem also tracks a key metric for each critical event, namely, the TTR the critical event. This massive amount of history can be represented in a large analytics table. For example, the attributes and TTR metric may form the columns of the analytics table and hundreds of thousands of rows for individual critical events form the rows. The Cognition Engine of the CRM subsystem in this example applies machine learning algorithms to this analytics table in two ways: pattern recognition and predictive.

Figure 9:
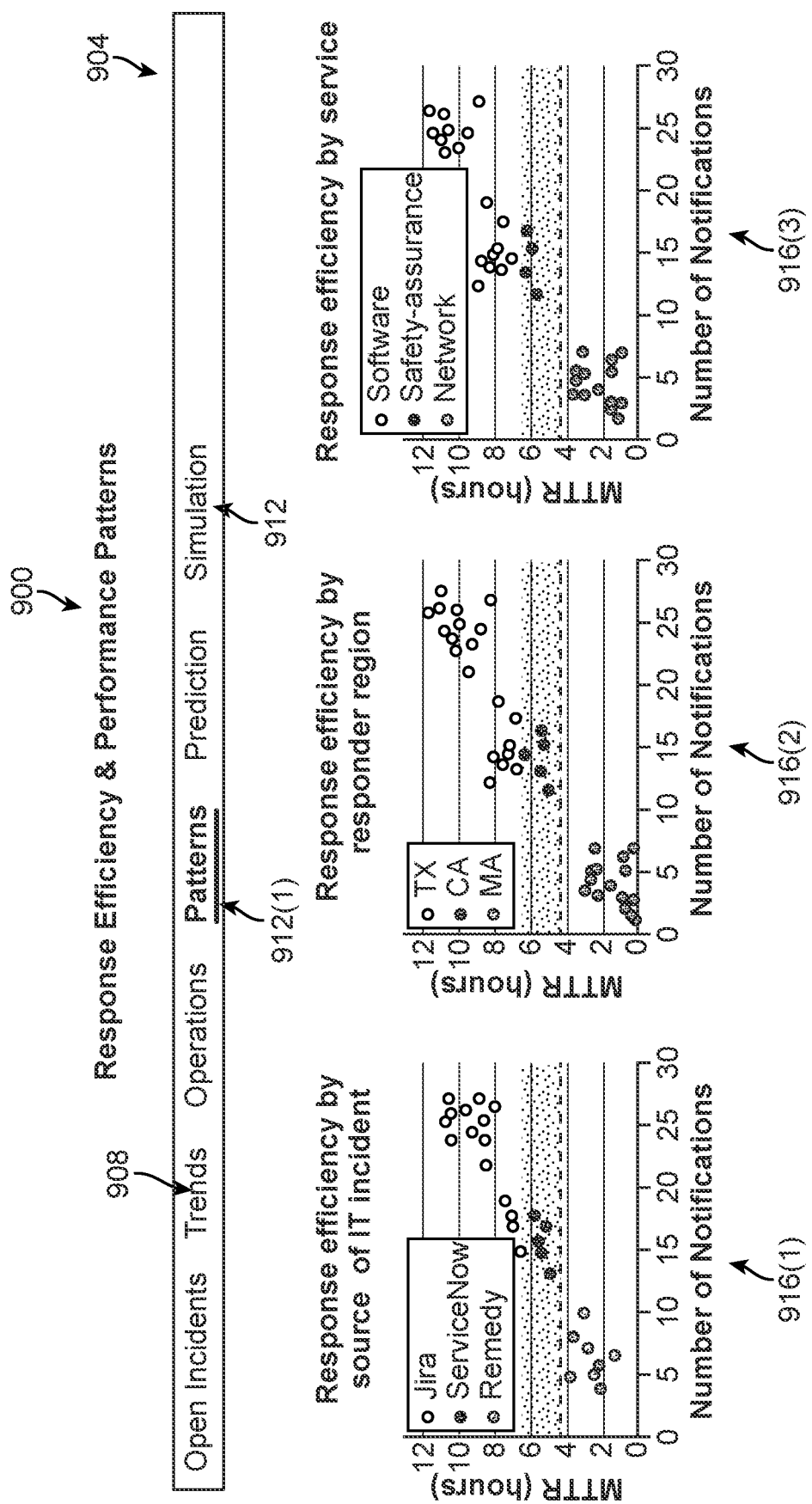
FIG. 9 is a screenshot of an example Analytics Dashboard GUI showing patterns detected using one or more pattern-recognition algorithms of the present disclosure.
Figure 10:
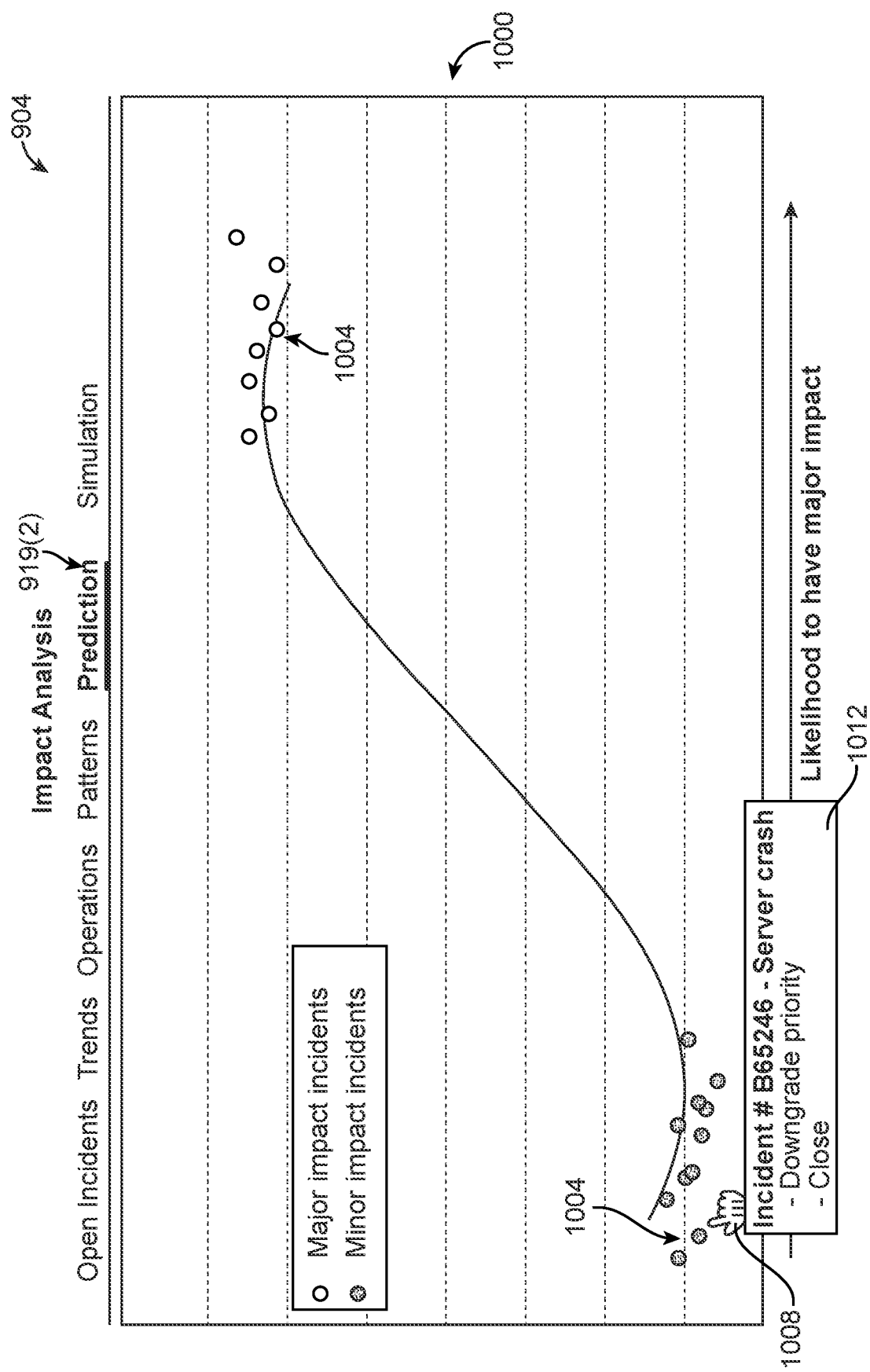
FIG. 10 is a screenshot of an example Analytics Dashboard GUI illustrating an interactive visualization of predictive results of classifying currently pending critical events using one or more predictive models, wherein the prediction is directed to the likelihood of having major impact.

Pattern Recognition. When the analytics table is fed into various machine-learning algorithms including, but not limited to, K-means and Gaussian Mixture Model, the cognitive engine will find patterns in the process of responding to critical events. For example, it will learn that the TTR is significantly affected by the values of certain attributes—that small differences in process can have a large effect on outcome. The CRM subsystem displays via an Analytics Dashboard or one more clustering charts that allow one or more knowledgeable users assess the patterns and, based on their assessments, take an appropriate action. Examples of pattern clustering charts are illustrated in FIGS. 9 and 10, discussed below in section 2.1.6. For example, these pattern clustering charts might lead managers to conclude that:

(a) issues reported by a trouble-ticketing system do not contain enough supporting information for resolvers to be able to diagnose the problem.

(b) the team in a specific geographic region needs extra training.

(c) the ROI on many software issues is not worthwhile.

An objective is to give decision-makers insights into how differences in their response processes affect efficiency measures, such as TTR.

Prediction. When the analytics table is fed into various predictive machine-learning algorithms including, but not limited to, random forest and support vector machine, the cognitive engine trains predictive models. The Cognition Engine can then use classification and/or regression algorithms to estimate which of may newly arriving critical events will be "major" events, i.e., those that will be most disruptive and/or will require the most resources to resolve. To increase the robustness and usefulness of the predictive models, the CRM subsystem displays via an Analytics Dashboard data for historical critical events, including any just-completed critical event, and prompts a knowledgeable user to append labels (e.g., Yes/No labels) to their historical data. For example, labels may indicate that a critical event:

was "tough," for example, took more than 48 hours to resolve.

required a response team larger than four people to resolve.

was a low-ROI event. The definition of low-ROI could be peculiar to each user-organization. For example, a low-ROI event could be defined as "cost the company more than $20,000 but saved the company less than $2,000."

reoccurred more than four times in one month.

had an unsatisfactory resolution.

was a major event.

These labels add extra, important information to the analytics table, and when a user organization adds them, they contribute to a new kind of learning by Cognition Engine. The predictive algorithms can recognize that certain combinations of labels and attribute patterns are significant. For example, that historically incidents taking a long time to resolve were ones where the coordinator waited too long before launching a smart channel. The Cognition Engine can build many different predictive models and will store them in a predictive-model datastore. When a new critical event arrives into the CEM system, the Cognition Engine scores it against some of the stored predictive models. For example, a new critical event might get a score of 85% likelihood that it will be a low-ROI event. Predictions such as these can help managers to decide to lower the priority of that critical event and instead focus the team on resolving other critical events.

Assist in identifying relationships between contemporaneous critical events. Software tools exist that are useful for clustering event signals coming from network intrusion detection probes. Those tools use a combination of statistical tests, logical rules with queries, and machine learning algorithms to decide if a series of events are correlated to one another and represent a cyber-attack on a network. A CRM subsystem of the present disclosure, however, can focus on the response to critical events and can complement those event-correlation tools. Following is an example of how a CRM subsystem of the present disclosure can complement use of an event-correlation tool.

Event signals can be collected outside the CEM system and fed in through the Orchestration subsystem. For example, many disaster events come through the GEOC feed of the Orchestration subsystem, and many IT incidents come through the iPaaS feed of the Orchestration subsystem. In this case, an event-correlation tool would use the Orchestration subsystem to trigger a CEM Incident if the event-correlation tool determined that a set of anomalous events constitute an attack on a certain part of a network. The CEM system would help to assign this incident to a team of network experts for resolution.

Around the same time an Application Ops team might use an ITA GUI to manually input an incident reporting that their "Payroll Service" GUI is sluggish. Everbridge would help to assign this incident to a team of application experts for resolution. Interconnecting thread: The GUI is sluggish because its underlying database link underwent failover from its primary (high-powered) database to a disaster-recovery (DR) secondary (low-powered) database that is many slow network hops away in another city. The automated failover happened because the primary database was corrupted by the cyber-attack.

Around the same time, the ANSIBLE TOWER® software is running its battery of regular structured query language (SQL) queries designed to check the service level agreement (SLA) of important database systems (such as the databases for the "Payroll Service" CMDB configuration item (CI). When the response times fall below the acceptable threshold, an CEM Incident is automatically generated because of the technical integration between the CEM system and the ANSIBLE TOWER® software. The CEM would help to assign this incident to a database administrator (DBA) team for resolution. Interconnecting thread: The SQL queries ran slowly because the database underwent failover from its primary (high-powered) database to a DR secondary (low-powered) database that is many slow network hops away in another city. The automated failover happened because the primary database was corrupted by the cyber-attack.

Around the same time, a senior database administrator gets locked out of her building, when returning from an outside break, because his badge fails to scan. Had she been able to get back to her desk she would have preempted the application incident. As an expert, she knows that the automated failover chooses an under-powered DR secondary database in an emergency, which she would then subsequently substitute for a different database in yet another zone. While she is waiting outside, she uses a CEM mobile app on her phone to submit an CEM incident about being locked out. Interconnecting thread: Her badge did not work because the badging system was crippled by the cyber-attack.

Around the same time, an alarm of a system-performance-monitoring system goes off because the heartbeat check failed for the badging system, and the system-performance-monitoring system has been automatically configured to trigger creation of a CEM incident via the Orchestration subsystem API. In this example, the CEM system has a technical integration to both the badging system and the system-performance-monitoring system. The CEM system helps to assign this incident to a Safety Ops team. Interconnecting thread: The heartbeat failed because the badging system was crippled by the cyber-attack.

Without knowing about the interconnecting threads, noted above, each of the individual teams would launch disconnected response processes each focusing only on their particular incident. The teams do not have the context to know that all of these critical events are all related to a common scenario—the cyber-attack. However, the CRM subsystem can make the connection because it:
- Runs business intelligence queries on the metadata for the above incidents and thus recognizes that they occur in close geolocations, had similar timeframes, and were connected to common CMDB CIs such as "Payroll Service."
- Has technical integrations to badging and other safety-assurance systems, DB APIs, monitoring tools, and ITSM tools that forward trouble tickets.
- Has a Service Dependency subsystem that recognizes connections among CIs.
- Manages on-call schedules for critical event resolution teams and receives their acknowledgments of assignments. Therefore, it recognizes when many teams have bursts of activities in an unusual fashion.

The CRM subsystem seeks user input and it will alert a user. For example, the CRM subsystem can tell them a user that it has assessed a high likelihood that these incidents are related and recommends responding in a coordinated fashion. It will, for example, prompt the user to create a coordinated "digital war room," which brings the multiple teams together and records who attended and decisions made. The digital war room uses a mixture of technologies, such as Slack and GoToMeeting integration, SMS messages, and video information channels, to pull the disparate teams together, informing them some of their incidents can only be resolved when one of the other teams first addresses their issue.

How the CEM system identifies impacted areas. Each critical event has attributes, such as service, application name, location, group(s) involved, responsibility, asset information, and time of the event. The CEM system has a datastore that contains the asset information, contact information, employee travel information, building badging events, etc. Along with contact data and asset information, there are some CMDB mappings. The CRM subsystem looks into this datastore to identify the dependencies and provide information to the user with a service dependency graph. Based on the CI impacted, the CEM system can tell the user the service(s) and software application(s) that are depending on that CI. Knowing the service(s) and application(s) that may be at issue because of the impacted CI, the CEM system can identify the group(s) that need to be involved and can further look into the scheduling management subsystem to identify the available personnel to staff the critical event response team(s).

How the CEM system may launch a CEM scenario and notify users. The Interactive Response Management subsystem can have a way to configure templates that can be invoked to notify people during the critical event. There can be multiple templates that can be selected based on the attributes of the critical event. The incident launch can happen via multiple source as described above relative to the manners in which the CEM system can be notified of symptoms of one or more incidents. When an incident comes in based on its attributes and rules defined in the system, the CEM system will select the template to notify the user. This is how the CEM system decides which users gets notified. The rules are defined in an IPaaS subsystem. In some cases, different messages need to be configured to different users. In that case Scenario is launched to send different messages to different users.

Templates can be configured to also derive contacts and groups from an on-call Calendar as well. When an incident is launched, the Orchestration subsystem talks to Scheduling APIs and extracts list of on-call staff from a specific calendar. These contacts are added to list of recipients. For example, if a user is launching an incident DB server issue, the template will be setup to derive on-call staff from a DBA calendar.

Each user configured as a contact may have several delivery paths that the CEM system can use to notify during the critical event. Each contact or other user can configure the desirable delivery methods as well as the sequence in which delivery methods are used to notify the user if the user does not acknowledge on first attempt to notify. The delivery methods for each contact can also be configured in a critical event template mentioned above and the delivery method can also be selected based on attributes of the incident.

How the CRM subsystem provides assistance to the users for resolving an critical incident. When the critical event is created, the CRM subsystem analyses attributes of the critical event, such as services affected, location, time, responsibility, impact areas, etc., to provide assistance to the end users. The assistance is provided by alerting users over one or more messenger platforms, such as the SLACK®, SPARK™, etc. platforms. In one example, the CRM subsystem interacts with the user using the following calls:
/eboncallnow: retrieves the list of on call users using the Schedule Management subsystem.
/findsimilaractiveincidents: retrieves list of incidents which happen to occur at the same time and are related. The CRM subsystem uses combination of things to identify the incidents using historical data to identify patterns, it looks in CMDB mappings and service dependency graph.

/findsimilarclosedincidents: retrieves list of incidents that happened in the past. The CRM subsystem uses combination of things to identify the incidents using historical data to identify patterns, it looks in CMDB mappings and service dependency graph.

/closeinciden: closes the critical event.

/launch: launch the critical event from different channels, such as Slack, Spark, etc.

/triggeraction: launch automated steps to resolve the critical event.

/get: Retrieve historical information on similar information which includes resolution information.

/suggestresolution: suggest resolution steps based on historical data.

/suggestresources: suggest right set of resources to resolve the incident.

/notify: notify other resources.

/incidentinfo: retrieves information on the current ongoing incident.

The CRM subsystem integrates over several channels to assist user during the critical event management. One of the mechanisms is integration with users over messenger platforms like Slack, Spark, etc. The CRM subsystem provides an interface for the user to query using above keywords.

2.1.6. Analytics Dashboards

As noted above, a CRM subsystem of the present disclosure includes one or more Analytics Dashboards that provide any one or more of a variety of functionalities to knowledgeable users of an organizational user. These functionalities relate to the cognitive features supported by the Cognition Engine of the CRM subsystem. Generally, and in the context of FIG. 8, the Cognition Engine may be considered to comprise the machine-learning algorithms for pattern discovery, model building, critical-event scoring, as well as the rules of rules database 856, along with the corresponding datastores and other aspects that provide the CRM subsystem with its cognitive functionalities. It is noted that the term "analytics dashboard" is used herein for convenience and should not be construed as necessarily requiring that it compose a unitary UI (or corresponding set of machine-executable instructions) that provides UI functionality solely for the Cognition Engine. In some embodiments, various screens that a CEM system of the present disclosure presents may include one or more portions that provide Cognition Engine functionality(ies) and one or more portions that provide functionality(ies) for aspects of the overall CEM system other than the Cognition Engine.

For example, one of the cognitive features of a CRM subsystem of the present disclosure the analyzing of an organization's historical critical events to identify patterns within those critical events. In this example, the Analytics Dashboard includes algorithms that generate information, such as charts, for display to a user that present the patterns to a user. Some example charts are illustrated in the screenshot 900 of FIG. 9, which illustrates a UI 904 of an example Analytics Dashboard 908.

As seen in FIG. 9, UI 904 includes six tabs 912 that provide various functionalities. In screenshot 900, a use has selected the Patterns tab 912(1), correspondingly, UI 904 displays a set of charts 916(1) to 916(3) that present various patterns to the user. In this example, chart 916(1) shows response efficiency by source of the incident (the current example is IT incidents and the sources are how the incidents entered the CEM system), chart 916(2) shows response efficiency by responder region (MA, CA, and TX being U.S. states), and chart 916(3) shows response efficiency by service. In this example, Analytics Dashboard 908 is periodically refreshed with cluster charts, because the CRM subsystem is continuously searching for patters among many attributes of critical events. Examples of attributes in which the CRM subsystem can find patterns include, but are not limited to, number of people involved in resolution, length of time taken, tools used, skills required, shifts scheduled, smart collaboration channels, environmental influences, delivery modalities for notifications, attributes read through integration with a CMDB, competing workload of resolvers, smart conferences, and temporal factors, among others.

UI 904 may have configuration controls (not illustrated) that allow the user to control how many different patterns the UI presents and how often the UI refreshes the patterns. In some embodiments, the user can be presented with recommended actions applicable for a given pattern. With the example of region chart 916(2), the CRM subsystem may, for example, suggest that the user codify an auto-assignment rule, such as "in future, all critical events with priority=high should be assigned to the team in MA."

Figure 11:
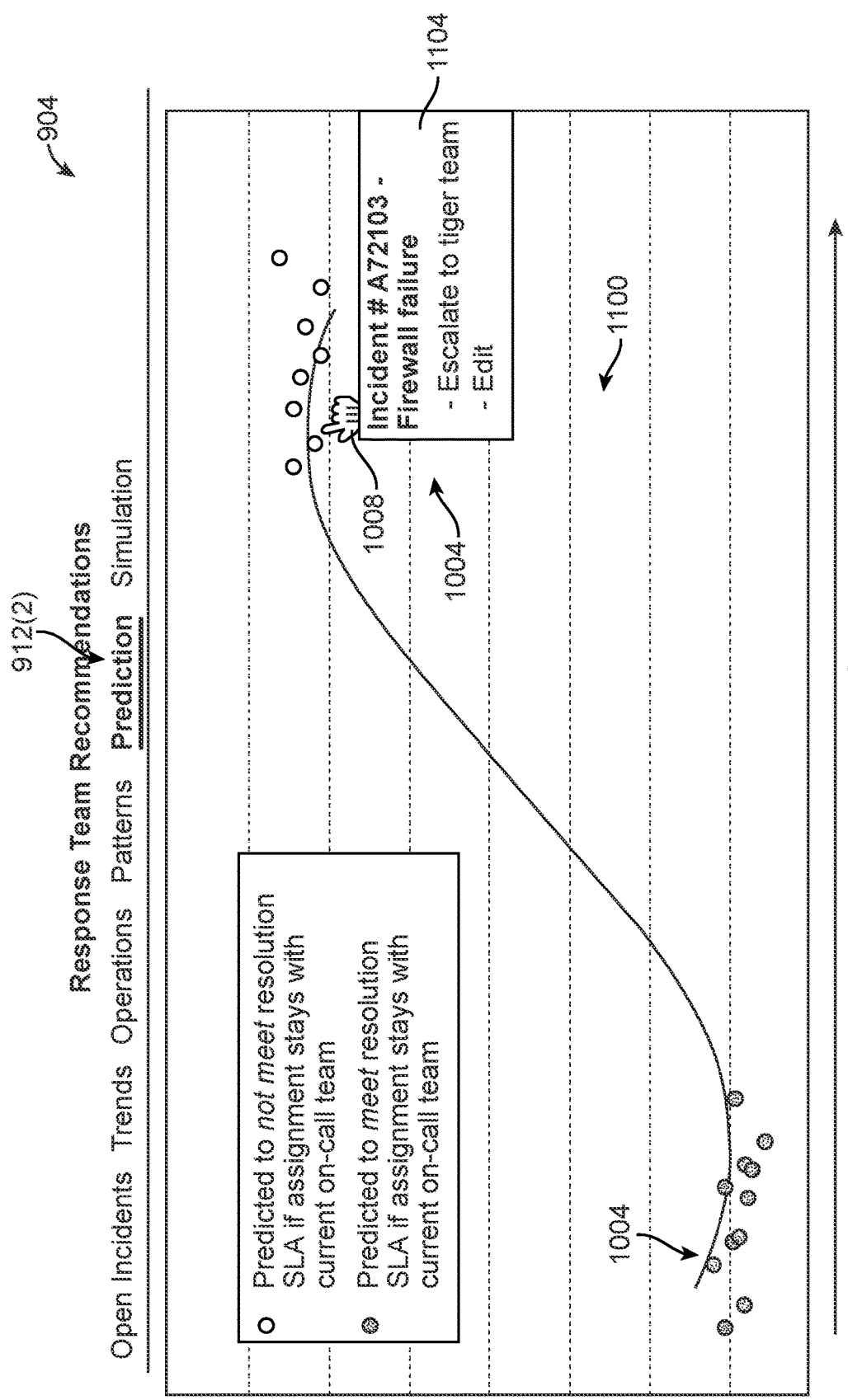
FIG. 11 is a screenshot of an example Analytics Dashboard GUI illustrating an interactive visualization of predictive results of classifying currently pending critical events using one or more predictive models, wherein the prediction is directed to the likelihood of missing a service level agreement (SLA) requirement.

FIG. 10 shows the same UI 904 as in FIG. 9, but with the Prediction tab 912(2) selected such that the Analytics Dashboard displays an S-curve chart 1000 that shows critical events 1004 currently in process according to how the Cognition Engine predicts their impact on the user organization's operations. FIG. 11 also shows the same UI 904 as in FIG. 9, also with Prediction tab 912(2) selected. However, in this example, the Analytics Dashboard displays a S-curve chart 1100 that shows critical events 1004 currently in process according to how the Cognition engine predicts the likelihood of missing the service level agreement (SLA) numbers.

In some embodiments, under Prediction tab 912(2) the Analytics Dashboard may refresh periodically with S-curves from a variety of differing predictive models that the Cognition Engine continually builds and maintains. In some embodiments, UI 904 provides user controls that allow a user to control how many predictions that that Analytics Dashboard displays and how often the Analytics Dashboard refreshes. In some embodiments, the Analytics Dashboard provides a dialog box that allows a knowledgeable user to take one or more selectable actions for each of critical events represented on the corresponding S-curve chart.

For example, in FIG. 10, S-curve chart 1000 provides predictive insight into the likely impact a new/open incident (a/k/a "critical event") will have on the business. Since priority should be given to resolving incidents likely to have a major impact, if the user right-clicks while hovering a cursor 1008 over one of critical events 1004 (as represented onscreen by an on-screen indicator) predicted to have minor impact, UI 904 opens a popup dialog box 1012 that, in this example, provides actionable suggestions to either Downgrade Priority or Close the incident in order to free up resources to work on the major impact incidents. As another example, in FIG. 11, S-curve chart 1100 provides predictive insight into the likelihood of a new or open incident being resolved within the relevant SLA based on current team assignment. For incidents likely to miss the SLA, if the user right-clicks while hovering cursor 1008 over one of critical events 1004 (as represented onscreen by an on-screen indicator), UI 904 opens a popup dialog box 1104 that, in this example, provides actionable suggestion for the user to Escalate/reassign to a different team the CEM system knows to be available and predicts to be able to resolve the incident within the SLA.

As another example, an additional cognitive feature of a CRM subsystem of the present disclosure the building of predictive models using information contained in an analytics table for historical critical events. As part of the model building, the Analytics Dashboard allows a knowledgeable user to add information to the analytics table that allows the predictive models to be based on data and information learned from responding to a critical event or learned after responding to a critical event. Examples of such information include, but are not limited to, cost to respond, TTR, performance of the response team, how the event was resolved, what mistakes were made, whether the originally assigned priority was too high or too low, whether or not the resolution was worth the effort, whether or not an incident is related to another contemporaneous incident, etc.

Figure 12:
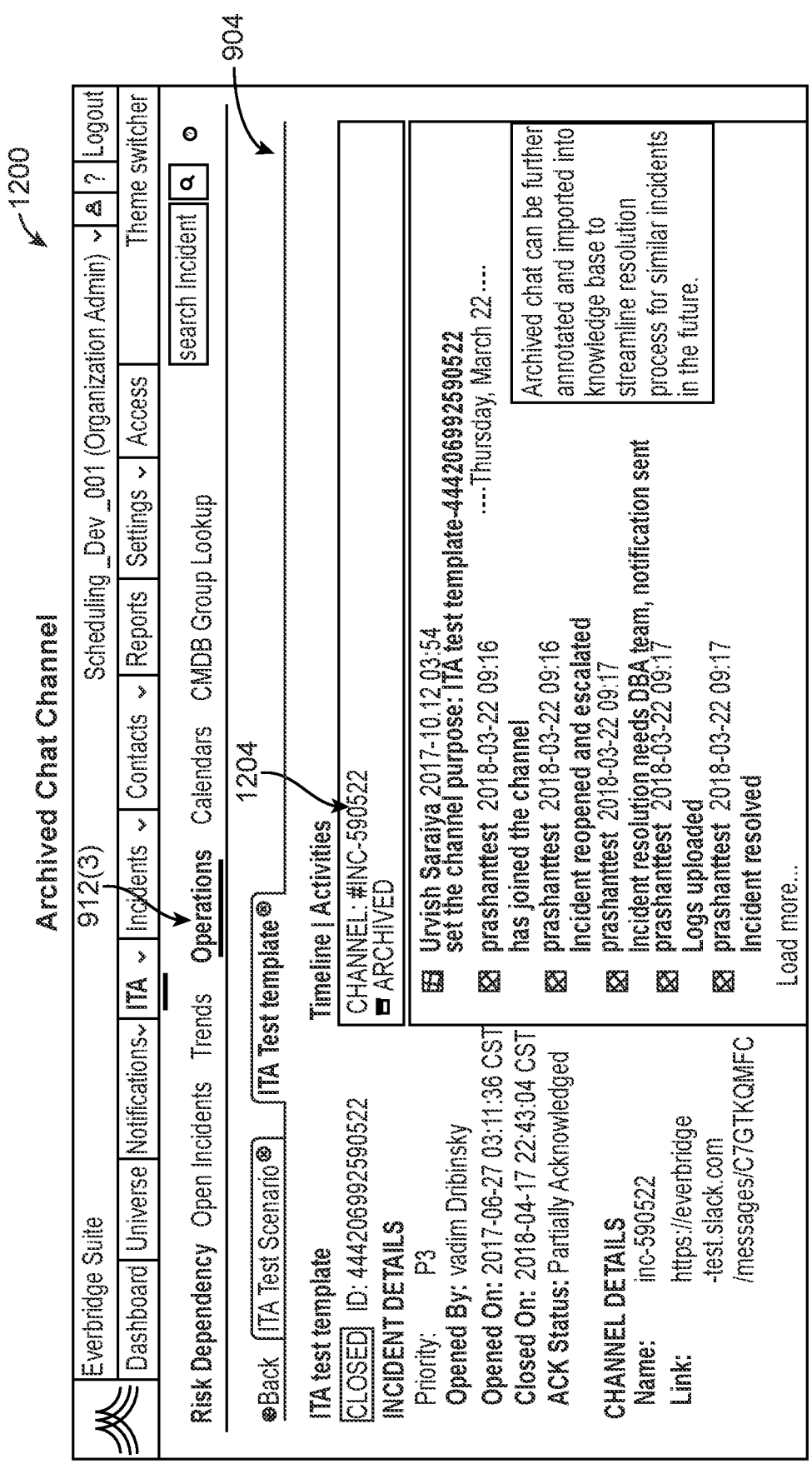
FIG. 12 is screenshot of an example Analytics Dashboard GUI that a user can use to annotate archived messaging channel conversations.

FIG. 12 illustrates a screen 1200 of UI 904 that can be a basis for annotating resolved critical events. After resolving a critical event, a knowledgeable team will often conduct a post-mortem using features of UI 904 available under the Operations tab 904(3). For example, the team may meet and share thoughts using a messaging channel 1204, and a user can use the UI to archive a transcript of the messaging channel so that users can retrieve the transcript later on. UI 904 can also be configured to allow a user to input relevant information in a more structured manner. In this connection functionalities that UI 904 may have under Operations tab 904(3) include, but are not necessarily limited to:

- Recording confirmation that events suspected as being related were indeed connected to the root cause. This actual confirmation can be very important for the learning process. Once these labels have been added, the Cognition Engine uses machine-learning algorithms to train the predictive models.
- recording how the event was resolved; can be automated as runbook workflow using an Orchestration subsystem (see, e.g., section 2.1.7.5 below), which could be used when a similar event occurs in the future.
- recording that this event had major impact, for example, took many resolvers, lasted for several days, and cost a lot of money. CRM subsystem feeds these labels into the Cognition Engine as feedback.
- recording which users were most instrumental in resolving the event. CRM subsystem feeds these labels into the Cognition Engine as feedback.
- recording what mistakes were made during the resolution process. CRM subsystem feeds these labels into the Cognition Engine as feedback.
- recording finding that the priority of the event was set too low or too high. CRM subsystem feeds this label into the Cognition Engine as feedback.
- etc.

As a further example, another cognitive features of a CRM subsystem of the present disclosure is the assessing of new incoming incident to determine how well they match with historical critical events. If there is a match or near match of a new incoming incident, then the Cognition Engine can use attributes of the corresponding historical critical event(s) to make predictions about the new incident. For example, the Cognition Engine can: suggest a response team that was highly effective on the same or similar type of incident; predict the importance of the incidence; predict a TTR; predict non-personnel resources that may be needed; predict other services that might be affected, etc. In this example, the Analytics Dashboard may display at least some of these or other suggestions and predictions to a knowledgeable user. The use can then, as desired, control aspects of the management of the new incoming incident using the Analytics Dashboard.

2.1.7. Example Architectural Flow

In some embodiments, a CRM subsystem of the present disclosure may be considered to be composed of two main subsystems: (a) an Interactive Response Management subsystem and (b) a Cognition Engine. In these embodiments, each of these subsystems leverages several subsystems of a CEM system to automate responses to critical events. At a high level, the Interactive Response Management subsystem interacts with users via a number of UIs, including an Analytics Dashboard, and the Cognition Engine provides cognition-based backend services that generate, among other things, information for different situations during a critical event. Each of the Interactive Response Management and Cognition Engines, as well as other subsystems of a CEM system, are described in the following sections.

Figure 13:
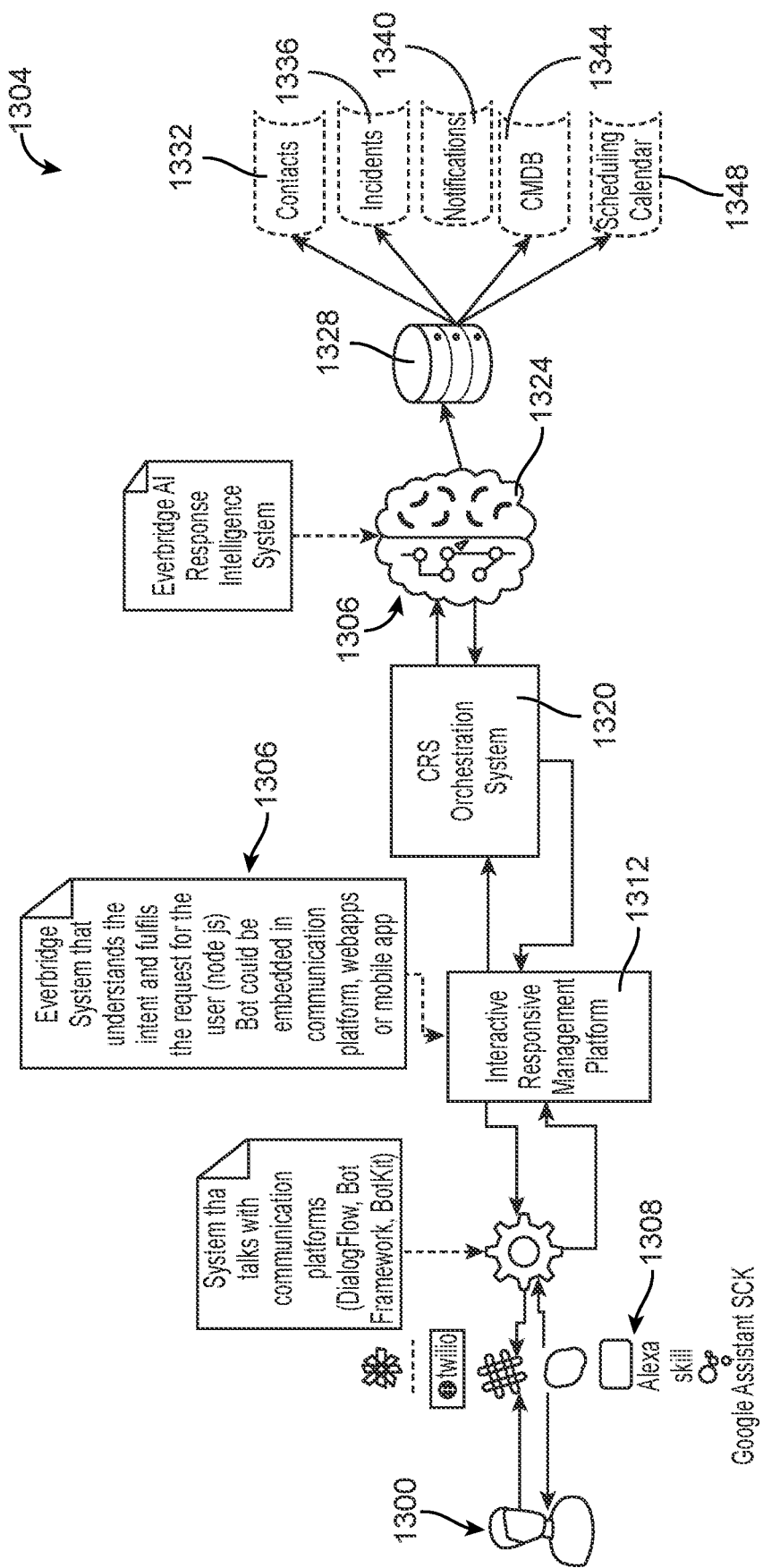
FIG. 13 is a diagram of an example overall architectural flow of a CEM system having a Cognitive Response Management (CRM) subsystem of the present disclosure.
Figure 14:
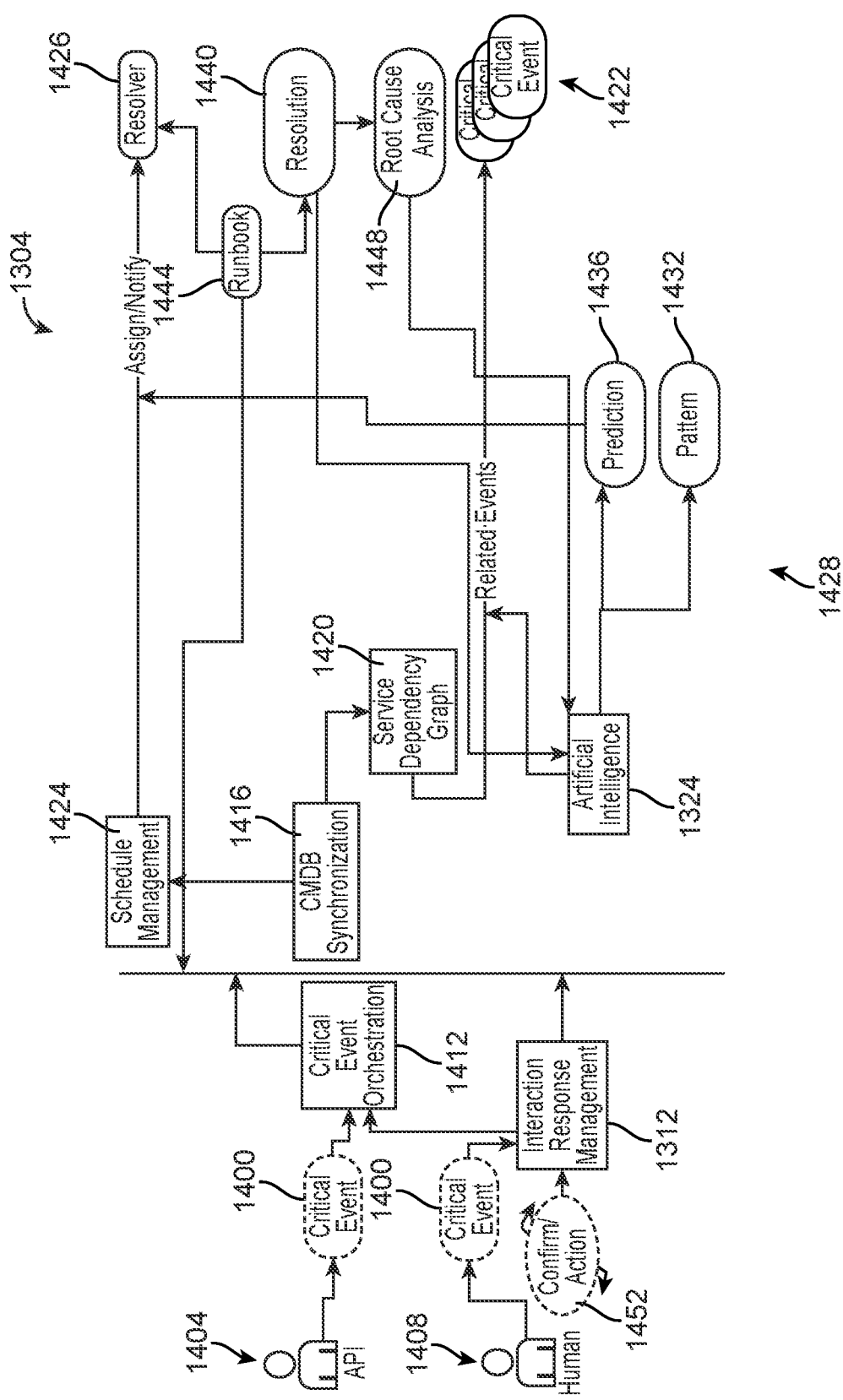
FIG. 14 is a diagram of an example workflow of the CEM system of FIG. 13.

FIGS. 13 and 14 illustrate, respectively, an example overall architectural flow and an example workflow for a CEM system 1304 augmented with a CRM subsystem 1306 of the present disclosure. As seen in FIG. 13, a user 1300 can interact with a CRM subsystem 1306 via any one or more of a wide variety of communication platforms 1308 via an Interactive Response Management subsystem 1312 that may communicate with the communication platform(s) via one or more suitable communication agents 1316. Interactive Response Management subsystem 1312 interacts with an Orchestration subsystem 1320, which, in turn, interacts with a Cognition Engine 1324 that provides any one or more of a variety of cognitive functionalities, such as the cognitive functionalities described above and below. Cognition Engine 1324 is in communication with one or more additional subsystems (not shown) and one or more datastores 1328 that contain a variety of information needed for CEM system 1304 to function. As seen in FIG. 13, examples of such information include, but are not limited to, contacts 1332 (e.g., names and associated information of potential responders and others that need to be contacted for a critical event), incidents 1336 (e.g., historical incidents that Cognition Engine 1324 uses in its learning), notifications 1340 (e.g., a collection of action-specific notifications to be sent to users during critical events), a CMDB 1344 (e.g., a description of organizational assets and their relationships with one another), and a scheduling calendar 1348, perhaps among others as needed.

Figure 15:
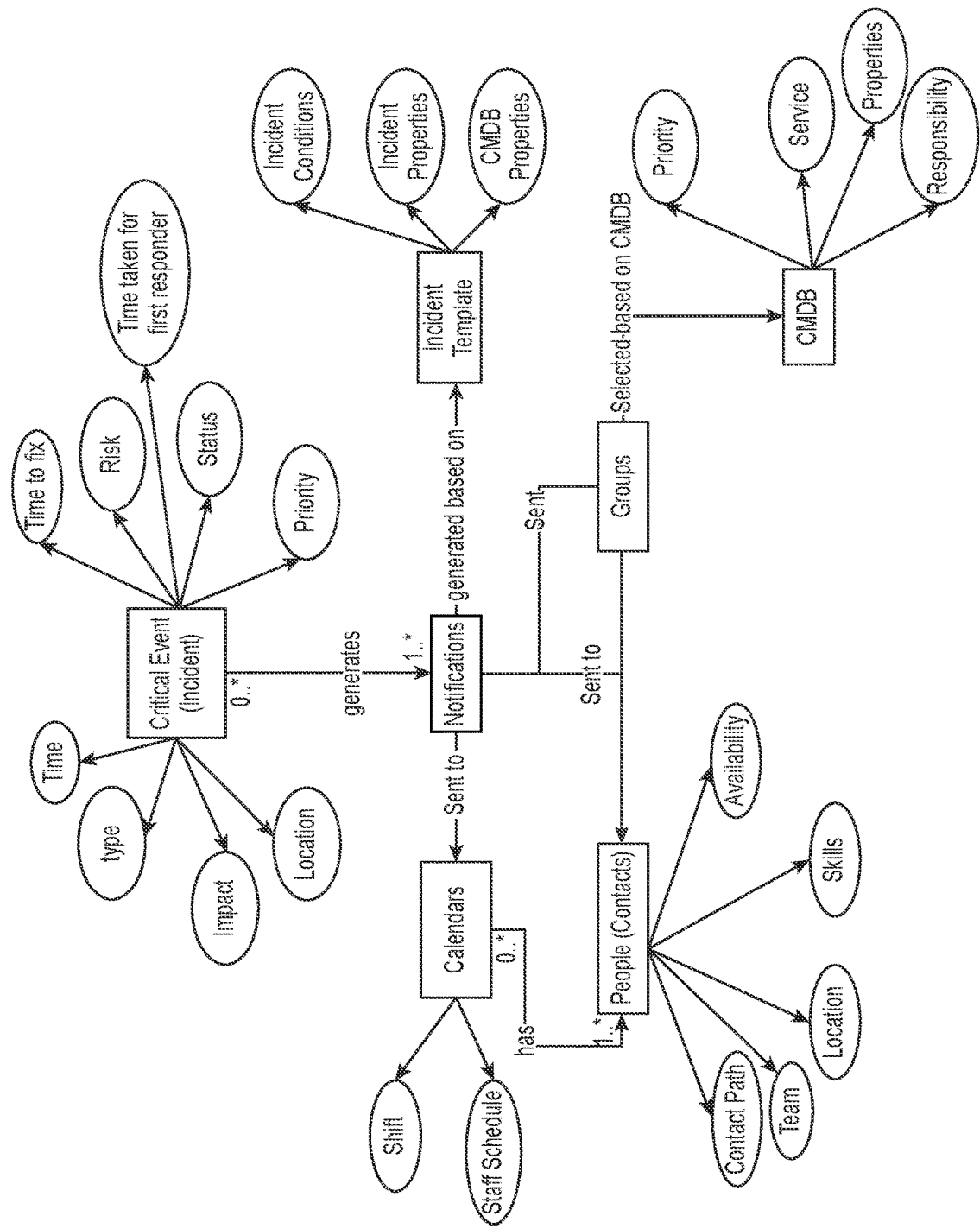
FIG. 15 is a diagram illustrating example attributes of critical events and various components of the CEM system of FIG. 13.

As noted above, FIG. 14 illustrates an example workflow for a CEM system of the present disclosure, such as CEM system 1304 of FIG. 13. In this example, an indication of one or more critical event, here represented by a single critical event 1400, can be introduced to the workflow through an application programming interface (API) 1404 from an external source (not shown), such as an IT system, a fire alarm, a seismic sensor, a weather warning system, etc., or through Interactive Response Management subsystem 1312 from a human user 1408. Critical event 1400 may be received by an Orchestration subsystem 1412 that manages the lifecycle of each critical event. On an incident response formulation side of the workflow, CEM system 1304 includes a number of subsystems, including Interactive Response Management subsystem 1312, a CMDB Synchronization subsystem 1416, a Service Dependency Graph subsystem 1420, a Schedule Management subsystem 1424, and Cognition Engine 1324. Each of the subsystems of CEM system 1304 illustrated in FIG. 14 is described below in detail. FIG. 15 illustrates an example usage by CRM subsystem 1306 (FIG. 13) of components of critical events and various subsystems of CEM system 1304 (FIG. 13) and the components' usage of various corresponding attributes of those critical events and subsystems. The reader is encouraged to refer to FIG. 15 as needed to fully understand this disclosure.

2.1.7.1. Interactive Response Management Subsystem

With occasional reference to FIGS. 13 and 14, and other figures as noted, in some embodiments Interactive Response Management subsystem 1312 of FIGS. 13 and 14, is a frontend facade of CRM subsystem 1306 that interacts with users via any one or more of a variety of differing communication platforms, such as communications platforms 1308 of FIG. 13. Interactive Response Management subsystem 1312 engages users and correspondingly interacts with other subsystems of CRM subsystem 1304 to respond to the users during a critical event.

Functions that Interactive Response Management subsystem 1312 can be configured to perform include, but are not limited to: retrieving information from users; generating questions to users in the context of critical events to gather more information; coordinating among other subsystems to generate responses to critical events; generating responses for end users. Interactive Response Management subsystem 1312 can be implemented as a software agent that helps user to interact with CEM system 1304. At a high level, Interactive Response Management subsystem 1312 will typically assemble responses using several other subsystems such as CMDB Synchronization subsystem 1416, Service Dependency Graph subsystem 1420, Orchestration subsystem 1412, Scheduling Management subsystem 1424, and Cognition Engine 1324.

Interactive Response Management subsystem 1312 may support several scenarios to act as an assistive agent on several communication platforms, such as SLACK®, SPARK™, and/or IT Alerting (ITA) Web Dashboard collaboration platforms, among others. Interactive Response Management subsystem 1312 may support these scenarios by creating intents that the users may invoke on communication platform(s) 1308. Some of the examples of the intent are below. A precondition for these intents may be that when critical event happens, Interactive Response Management subsystem 1312 creates a communication channel for people to collaborate and resolve the event.

Analyzing the Impact of a Critical Event: On the communication channel, and looking at the event details like services, location, people involved, Interactive Response Management subsystem 1312 may interact with Service Dependency Graph subsystem 1420 to identify the dependencies. If any of the information is missing, Interactive Response Management subsystem 1312 may interact with the user to provide the input on the attributes. Based on the dependencies, Interactive Response Management subsystem 1312 will provide insights to the user on the dependencies.

Assemble/gather resources for a critical event: On the communication channel, and based on the critical event information, Interactive Response Management subsystem 1312 may look into historical data to identify the people that can resolve the issue and may interact with the Scheduling Management subsystem 1424 to find the people available. Looking at the response times of the available people, Interactive Response Management subsystem 1312 may assemble the people who can fix the issue and then provide a recommendation to the user. Interactive Response Management subsystem 1312 may also interact with user to get their inputs to notify the identified resources.

Provide a list of dependent services to the users: Interactive Response Management subsystem 1312 may provide a list of dependent services and interact with user to launch an Event Scenario to notify different stakeholders. Interactive Response Management subsystem 1312 may interact with Orchestration subsystem 1320 to initiate this.

Provide Interaction with the Scheduling Management subsystem: Interactive Response Management subsystem 1312 may interact with Scheduling Management subsystem 1324 to provide the list of on call people using keywords and by providing each user with the ability to mark oneself unavailable.

Interact with Orchestration Subsystem to manage the critical event: Interactive Response Management subsystem 1312 may interact with Orchestration subsystem 1320 to, for example, launch an incident, close an incident, and launch a scenario, among other things.

Interact with Cognition Engine to provide cognitive-based functionality: Interactive Response Management subsystem 1312 may be considered to include the Analytics Dashboard described above in section 2.1.6. As described above, the Analytics Dashboard provides functionality that utilizes aspects of Cognition Engine 1324, such as: pattern discovery in which machine-learning algorithms discover patterns in attributes of historical critical events; predictions about newly arriving critical events; and automating actions in response to newly arriving critical events. Examples of GUIs of an example Analytics Dashboard and screenshots of such GUIs are described above in section 2.1.6 and shown in accompanying FIGS. 9-12.

2.1.7.2. Configuration Management (CMDB) Synchronization Subsystem

With continuing reference to FIGS. 13 and 14, CMDB Synchronization subsystem 1416 synchronizes an end-user organization's configuration management system (not shown) into the CMDB service of CEM system 1304 that is leveraged by CRM subsystem 1428 to determine the impacted services and identify the right set of groups to fix the issue based on the entries in the CMDB Synchronization subsystem. The result of the identifications are groups may be fed into a Critical Event Communication and Notification Engine (not shown) to further notify the individuals.

CMDB Synchronization subsystem 1416 may comprise two components: a provisioning/synchronizing component and a lookup component. The provisioning/synchronizing component provisions and synchronizes the entries from a user organization's configuration management system (not shown) to create the CMDB properties, values, and the mapping. Each CMDB entry may be described as CMDB property in CEM system 1304 containing the name and set of values. The CMDB Mappings associates the CMDB properties with the groups with CEM system 1304.

The lookup component looks up the groups based on the name and value from the CMDB mappings created in CEM system 1304. Each mapping component has a set of key-value pairs of CMDB properties that are associated with groups in CEM system 1304. The look up is across all the mappings that satisfies the query for the look up. The system identifies the set of groups that satisfies the query condition for the CMDB properties.

2.1.7.3. Service-Dependency Graph Subsystem

Service-Dependency Graph subsystem 1420 illustrates how critical events (typically affecting a lower-level device, building, or human resource) impact higher-level services such as Payroll service or Financial Reporting service. Its interactive mode lets a user explore relationships among resources and understand how they impact each other when disrupted. Service-Dependency Graph subsystem 1420 utilizes data from CMDB Synchronization subsystem 1416 to generate one or more service-dependency graphs, such as service-dependency graph 648 of FIG. 6C, that graphically illustrates the impact that critical event 1400 and, as appropriate, one or more other related critical events (represented collectively at critical-event grouping 1422). Critical-event grouping 1422 is the set of related events that have occurred in the past and/or are happening at the current moment based on attributes and characteristics of critical event 1400 based on, for example, commonalities, such as service dependency, CMDB mapping, location, etc., as determined by one or more algorithms in Cognition Engine 1324.

2.1.7.4. Schedule Management Subsystem

In some embodiments, Schedule Management subsystem 1424 is used by CEM system 1304 to identify the people on call and available based on the attributes of the critical event. Schedule Management subsystem 1424 contains a set of calendars and each calendar contains set of shifts which consists of the staff schedule. Schedule Management subsystem 1424 may identify the person via one or more of the following criteria, among others: assignment in shift; sequencing of staff; unavailable schedule for the shift; and replacement schedule on the shift. Cognition Engine 1324 may assist users, for example, in interacting with the Schedule Management subsystem 1424 to provide insights to users on who is on call and provide an ability to make changes to schedule like making someone unavailable. A user may invoke Cognition Engine 1324 to know the schedule of the on call people, and the CRM subsystem will interact with Schedule Management subsystem 1424 to provide data to the operator during a critical event. Schedule Management subsystem 1424 may also automatically assign a Resolver 1426, i.e., one or more people having skills needed to resolve critical event 1400 and automatically notify the Resolver of the assignment via one or more suitable communications channels, including phone, SMS messaging, email, among others, and combinations thereof. Once Resolver 1426 has been notified and has acknowledged the presence of critical event 1400 and that they are going to take the necessary action(s) to resolve the critical event, if the initiator of the critical event was human user 1408, Interactive Response Management subsystem 1312 may issue a Confirm/Action notification 1452 to the human user to notify the user that the critical event is properly being attended to.

2.1.7.5. Orchestration Subsystem

Orchestration subsystem 1412 manages the life cycle of a critical event, because it opens and closes the critical event object in CEM system 1304. In this example, Orchestration subsystem 1412 includes:

A RESTful API (sometimes known as iPaaS) to capture very detailed attributes of a critical event. Based on triggers from third-party products, this subsystem can launch templates to notify recipients and will capture their responses.

Templates predefined for how to notify people about a critical event, and how to escalate to senior managers.

Workflows predefined for conditional response to typical critical event flows. Workflows can be used to decide the order in which recipients should be notified, and how to automatically remediate a critical event based on recipients' responses. Workflows use the attributes of a critical event, fields pulled in CMDB Synchronization subsystem, 1416 and properties from the Scheduling Management subsystem 1424 and cues from recipients responses to make branching decisions. FIG. 14 is an example workflow that takes different paths based on whether a critical event is new, is being updated with new information, or is being resolved.

In some embodiments, CEM system 1304 combines these pieces into pre-built integrations with some third-party products, such as safety alerting engines and IT monitoring engines, to orchestrate the communication around, and response to, a critical event.

2.1.7.6. Cognition Engine

In this example, Cognition Engine 1324 includes a multitenant analytics data repository that receives information on historical critical events via feeds from a data pipeline of CEM system 1304 and includes algorithms that perform clustering, regression, and classification on the historical critical events. Cognition Engine 1324 may also include a continuous learning process that is constantly iterating to recognize patterns and to build predictive models under direction from users (e.g., data scientists) from each of one or more user organizations and may include a depot to store outcomes from the learning process, including patterns and predictive models.

Output of Cognition Engine 1324 includes Patterns 1432 and Predictions 1436, depending on the mode of operation. Patterns 1432 include patterns discovered in past critical events using one or more pattern-recognition algorithms (discussed above), and these patterns can help in classifying and/or grouping critical events with one another, as described above in section 1.1. Predictions 1436 include predictions about critical event 1400 determined using one or more predictive models (discussed above). Examples of predictions include, but are not limited to, the severity of a critical event, the impact of the crucial event, the skills of the people who can resolve the critical event, and the cost incurred from the critical event, among others. As discussed above in sections 1.1 to 1.6, CEM system 1304 can be configured to display Patterns 1432 and Prediction 1436 in any of a number of formats and GUIs. Cognition Engine 1324 labels each outcome with metadata describing the data set and algorithm used.

In some embodiments, Cognition Engine 1324 includes a rules engine where learnings from pattern recognition (discovered from historical events) can optionally be enforced automated actions on newly arriving critical events. It may also include a real time scoring engine that can score newly arriving critical events against stored outcomes. As an example: does this new incident fit a pattern—is it similar enough to these past events that the CRM subsystem can suggest which resolvers to assign or which orchestration workflow to use? Interaction Response Management subsystem 1312 can be used to double-check user approval for this kind of assignment and automation. As another example: does the system predict that this new incident will become a major incident?; should it be re-prioritized and reassigned to a higher skill-level? As part of predicting as a "major" incident, Cognition Engine 1324 can give an estimate of the time and expense to resolve. Other examples of functionality that Cognition Engine 1324 can include are described above in sections 1.1 to 1.6.

2.1.7.7. Additional Functionality

FIG. 14 illustrates that CEM system 1304 may include additional functionality relating to reaching a Resolution 1440 for critical event 1400. For example, and as discussed above in connection with FIGS. 6A to 6E and in section 2.1.2, CEM system 1304 may include automation (labeled "Runbook" 1444 in FIG. 14) that allows Resolver 1426 to initiate the running of script that performs one or more actions automatically, i.e., without further human involvement. An example is described above in connection with FIGS. 6A to 6E.

The example also illustrates the performance of a Root Cause Analysis 1448 after Resolution 1440 of critical event 1400. Root Cause Analysis 1448 is a process of performing a "post-mortem" on critical event 1400 to identify and assess the cause of the critical event and the actions taken by Resolver 1426 in reaching Resolution 1440 to the critical event. As illustrated in FIG. 14, results of Root Cause Analysis 1448 can used to update the one or more predictive models of Cognition Engine 1324. As described above in sections 1.1 to 1.6, a user can use one or more GUIs provided by CEM system 1304 to annotate critical-event data and/or otherwise change one or more attributes of critical event 1440. Once the data for critical event 1400 has been changed, Cognition Engine 1324 can update the predictive model(s) accordingly.

3. Examples

Following are several real-world critical-event scenarios and examples of how a CRM subsystem of the present disclosure can enhance the management of such critical events.

3.1. Distributed Denial of Service (DDoS) Attack Scenario

This scenario depicts a situation when a DDoS attack is launched on an organization's systems that are responsible for keeping the business running. In this event, there can be a possibility of multiple symptoms impacting different areas of the business. Example of such symptoms include:
  performance degradation in serving end users;
  security monitoring systems alert a security team;
  application monitoring systems trigger several alerts; and
  end users raise organization support tickets.

In this example, the root cause of all of these symptoms is the DDoS attack. For this event, a CRM subsystem of the present disclosure, in cooperation with other subsystems of a CEM system that the organization uses, helps the organization manage the critical event by carrying out the following activities:
  identifies the impact areas, such as dependent services;
  launches a CEM scenario that:
    notifies stakeholders;
    identifies the people that can fix the issue quickly based on analysis from environmental attributes;
    notifies people needed to resolve the critical event;
    assesses the likely impact of the critical event based on past similar critical events;
    notifies users on the predicted impact of the critical event;
  provides assistance to a knowledgeable user to resolve issues attendant the critical event via the following mechanisms:
    assists in clustering the duplicate issues so that effort is streamlined;
    assists in finding the resolution by gathering data and analyzing the situation;
    orchestrates resolution of the critical event;
  predicts the likely damage (impact) from the critical event; and
  predicts the likely TTR for users and stakeholders.

3.2. Tornado Scenario

When a tornado is approaching a location (such as a datacenter, a building, or a social event), the CRM subsystem will be able to allow a business analyst to simulate the impact of the critical event on a service impact map. The analyst will be able to look at the map to check the status of, for example:
  employees that work in the location;
  visitors scheduled to visit the building;
  service dependency map of impacted assets: physical, services;
  upstream and downstream dependencies on business units and services located in the building;
  entire supply chain including degrees of separation (suppliers of suppliers).

The CRM subsystem will be able to indicate to the business analyst (or incident operators, incident administrators, or responders) the possible corrective actions to take, such as:
  launch the evaluation procedures to assess the situation;
  understand which back up business unit personnel need to cover based on the data visualization;
  identify services that are impacted and run book procedures for data backup and service continuity based on the interactive and prescriptive capabilities of the system;
  initiate notification to the affected teams leveraging the CMDB group lookup and scheduling system; and
  start smart conference and collaboration to bring the crisis management team together to initiate governance, risk, and compliance procedures.

The CRM subsystem will be able to ensure communication and collaboration of people and assets to make sure the critical event is managed cohesively.

3.3. IT Critical Event—Outage Scenario

In a case when an IT outage happens, the CRM subsystem can enable the business analysts or responders to track and reach out quickly, correctly, and automatically. Example of capabilities the CRM subsystem can provide include:
  enable the business analysts to identify the right group by the CMDB group lookup and the scheduling system;
  provide interactive capabilities for the user to fetch more information based on the machine learning intelligence;
  provide prescriptive solution for the user to assess the impact and the get the other teams on the incident; and
  offer the prediction to argument the knowledge for the users such as the similar historical events and the past responses.

4. Example Computing System

It is to be noted that any one or more of the aspects and embodiments described herein may be conveniently implemented in and/or using one or more machines (e.g., one or more computers, one or more network devices, or any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 16:
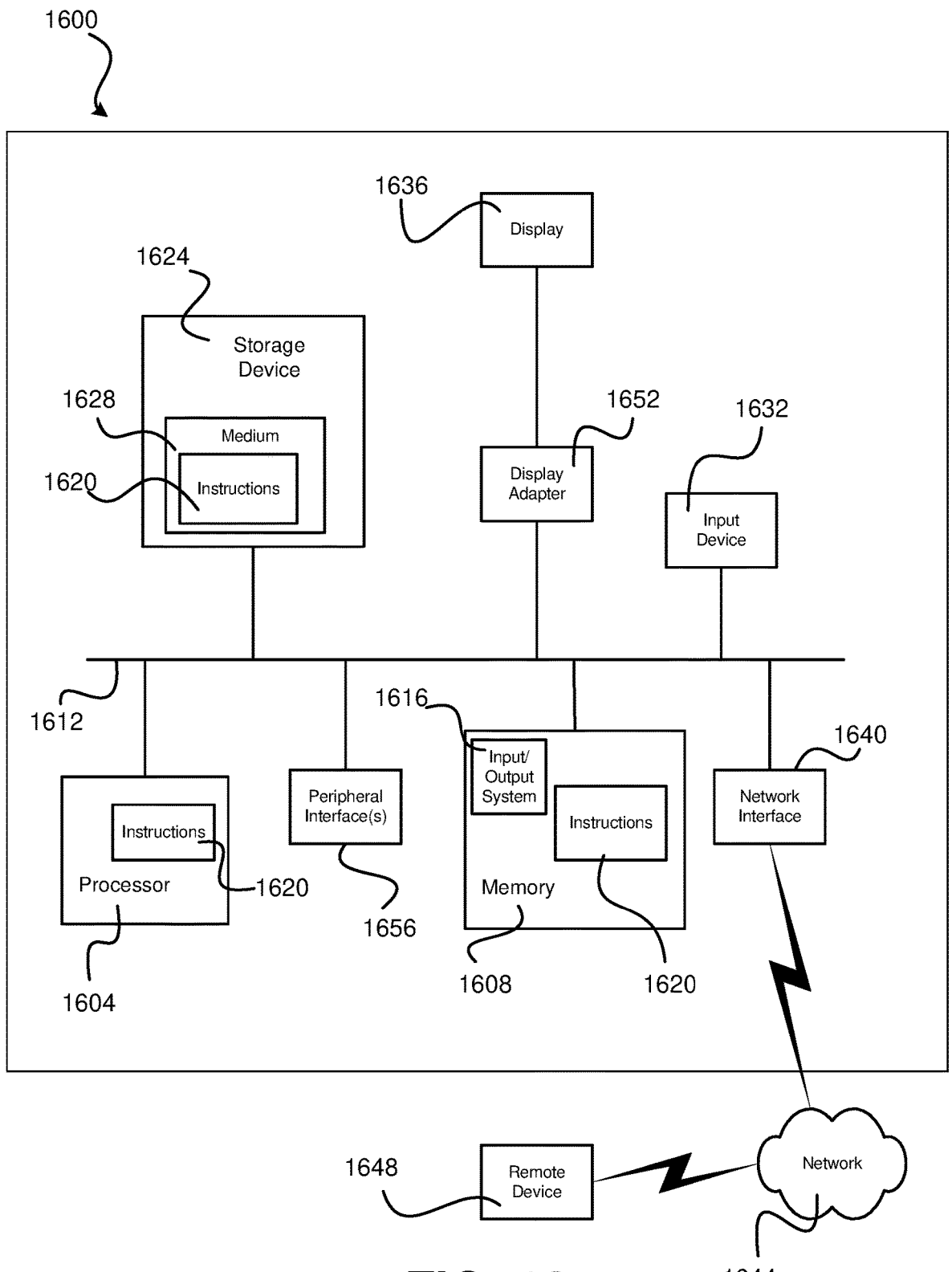
FIG. 16 is a high-level diagram illustrating a computing system that can be used to implement any one or more of the software-based functionalities disclosed herein.

FIG. 16 shows a diagrammatic representation of one embodiment of a computing device in the exemplary form of a computer system 1600 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Memory 1608 may include various components (e.g., machine-readable media) including, but not limited to, a random access memory component, a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive, a magnetic disk drive, an optical disc drive in combination with an optical medium, a solid-state memory device, and any combinations thereof. Storage device 1624 may be connected to bus 1612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1624 (or one or more components thereof) may be removably interfaced with computer system 1600 (e.g., via an external port connector (not shown)). Particularly, storage device 1624 and an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640, may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

Computer system 1600 may further include a video display adapter 1652 for communicating a displayable image to a display device, such as display device 1636. Examples of a display device include, but are not limited to, a liquid crystal display (LCD), a cathode ray tube (CRT), a plasma display, a light emitting diode (LED) display, and any combinations thereof. Display adapter 1652 and display device 1636 may be utilized in combination with processor 1604 to provide graphical representations of aspects of the present disclosure. In addition to a display device, computer system 1600 may include one or more other peripheral output devices including, but not limited to, an audio speaker, a printer, and any combinations thereof. Such peripheral output devices may be connected to bus 1612 via a peripheral interface 1656. Examples of a peripheral interface include, but are not limited to, a serial port, a USB connection, a FIREWIRE connection, a parallel connection, and any combinations thereof.

As those skilled in the art will readily appreciate, the foregoing descriptions use the terms "system" and "subsystem" for convenience of explanation and not to denote that the functionalities of these systems and subsystems must be compartmentalized into discrete systems and subsystems and/or corresponding software modules or applications. Rather, the terms "system" and "subsystem" are used to group related software functionalities with one another for ease of presentation. Those skilled in the art will readily appreciate that machine-executable instructions for software systems as complex as a CRM subsystem and a CEM system can be configured and deployed in any of a wide variety of ways, including, but not limited to, a single-tenant on-site deployment at a particular organization to a multitenant iPaaS deployment.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of assisting a user with critical-event management, the method being performed by a computing system and comprising:
   displaying, to a user via a graphical user interface (GUI) of the computing system, information concerning a first stored critical event;
   soliciting, via the GUI, a user to provide one or more attribute annotations for one or more corresponding respective attributes of the first stored critical event;
   receiving, from the user via the GUI, the one or more attribute annotations;
   storing, in memory of the computing system, the one or more attribute annotations in an analytics table comprising values for a plurality of attributes of each of a plurality of stored critical events, including the first stored critical event;
   executing at least one first predictive algorithm that operates on contents of the analytics table so as to build one or more predictive models representing at least some of the plurality of stored critical events; and
   storing, in a memory of the computing system, the one or more predictive models;
   wherein the first stored critical event is a closed critical event.

2. The method of claim 1, further comprising:
   receiving, via an event notification interface, a notification of a new critical event;
   executing a second predictive algorithm that uses the one or more predictive models to automatically classify one or more attributes of the new critical event; and
   based on the automatic classifying, predicting a value for each of the one or more attributes of the new critical event.

3. The method of claim 2, further comprising displaying, to the user on the GUI, the value for at least one of the one or more attributes.

4. The method of claim 2, wherein one of the one or more attributes comprises a cost associated with resolving the new critical event, and at least one of the values includes a predicted cost amount.

5. The method of claim 2, wherein one of the one or more attributes comprises a response team identification, and at least one of the values includes a suggested response team.

6. The method of claim 2, wherein one of the one or more attributes comprises a time to resolution, and at least one of the values includes a predicted time to resolution value.

7. The method of claim 2, wherein one of the one or more attributes comprises a resolution cost, and at least one of the values includes a predicted resolution cost value.

8. The method of claim 2, wherein one of the one or more attributes comprises a return on investment, and at least one of the values includes a predicted return on investment value.

9. The method of claim 2, further comprising:
   retrieving, from a datastore in memory of the computing system, data contained in an analytics table comprising values for a plurality of attributes of each of a plurality of currently active critical events, including the value for each of the one or more attributes of the new critical event;

executing at least one pattern-recognition algorithm that has been trained to identify patterns within the plurality of attributes among the plurality of currently active critical events and to assign differing portions of the data to differing clusters based on the patterns, wherein executing that at least one pattern-recognition algorithm includes operating on the data in the analytics table so as to assign the differing portions of the data to the differing clusters;

executing a visualization algorithm to generate a visualization depicting the differing clusters to which the at least one pattern-recognition algorithm has assigned the differing portions of the data; and displaying, via the GUI of the computing system, the visualization to the user;

wherein the visualization graphically depicts each of the plurality of currently active critical events, including the new critical event, as a graphical indicator configured as a control that, upon user selection, causes the GUI to display to the user information regarding the corresponding one of the currently active critical events.

10. The method of claim 9, wherein the information includes an action the user can select, the action displayed in conjunction with a user-selectable control that allows a user to select the action.

11. The method of claim 10, wherein the plurality of currently active critical events have a first attribute, and the action includes allowing the user to change a first value of the first attribute via the GUI.

12. The method of claim 11, wherein the action includes allowing the user to change a priority of a corresponding one of the plurality of currently active critical events via the GUI.

13. The method of claim 11, further comprising receiving the first value via the GUI and updating the analytics table with the first value.

14. The method of claim 1, further comprising:
receiving, via an event notification interface, a notification of a new critical event affecting a resource;
executing a second predictive algorithm that uses the one or more predictive models to automatically determine one or more suggested actions that a responder can take in resolving the critical event;
based on the resource affected, automatically determining one or more services associated with the resource affected;
displaying, via the GUI of the computing system, a service-dependency graph visually depicting the one or more services, the resource affected, and an impact that the critical event has on the one or more services, wherein the resource affected is represented by a user-selectable icon;
receiving via the GUI a user selection of the user-selectable icon; and
in response to the user selection, displaying to the user via the GUI a popup window that allows a user to view the one or more suggested actions.

15. The method of claim 14, wherein at least one of the one or more suggested actions includes machine-executable script for performing the corresponding action automatically.

16. The method of claim 15, further comprising receiving a user selection of that at least one suggested action having the machine-executable script and, in response, executing the machine-executable script.

17. The method of claim 16, further comprising receiving a notification that the machine-executable script has been successfully executed and displaying to the user via the GUI an indication of the successful execution.

18. The method of claim 14, further comprising displaying via the GUI and in association with the user-selectable icon a visual indication of the critical event.

19. The method of claim 14, wherein the critical event is an information-technology event.

20. A machine-readable storage medium containing computer-executable instructions that, when executed by a computing system, perform the method of claim 1.

* * * * *